(12) United States Patent
Haffner et al.

(10) Patent No.: US 10,089,430 B2
(45) Date of Patent: Oct. 2, 2018

(54) INTEGRATED CIRCUITS AND METHODS OF DESIGN AND MANUFACTURE THEREOF

(71) Applicant: Infineon Technologies AG, Neubiberg (DE)

(72) Inventors: Henning Haffner, Pawling, NY (US); Manfred Eller, Beacon, NY (US); Richard Lindsay, Beacon, NY (US)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 15/681,934

(22) Filed: Aug. 21, 2017

(65) Prior Publication Data

US 2017/0344690 A1    Nov. 30, 2017

Related U.S. Application Data

(62) Division of application No. 15/093,646, filed on Apr. 7, 2016, now Pat. No. 9,767,244, which is a division
(Continued)

(51) Int. Cl.
*G06F 17/50* (2006.01)
*H01L 21/28* (2006.01)
(Continued)

(52) U.S. Cl.
CPC ............ *G06F 17/5072* (2013.01); *G03F 1/00* (2013.01); *H01L 21/0334* (2013.01);
(Continued)

(58) Field of Classification Search
CPC .... G06F 17/5072; G06F 2217/12; G03F 1/00; H01L 21/0334; H01L 21/28123; H01L 21/823425; H01L 21/823437; H01L 27/0207; H01L 27/082; H01L 27/085; H01L 27/088; H01L 29/6659; H01L 29/7833; Y10T 29/41
See application file for complete search history.

(56) References Cited

U.S. PATENT DOCUMENTS 5,308,741 A    5/1994    Kemp
5,563,012 A    10/1996   Neisser
(Continued)

OTHER PUBLICATIONS

Haffner, H., et al., "Mastering Double Exposure Process Window Aware OPC by Means of Virtual Targets," Proc. SPIE Int. Soc. Opt. Eng. 6349, 63491W, 2006, 11 pages.
(Continued)

*Primary Examiner* — Yasser A Abdelaziez
(74) *Attorney, Agent, or Firm* — Slater Matsil, LLP

(57) ABSTRACT

Integrated circuits and methods of manufacture and design thereof are disclosed. For example, a method of manufacturing includes using a first mask to pattern a gate material forming a plurality of first and second features. The first features form gate electrodes of the semiconductor devices, whereas the second features are dummy electrodes. Based on the location of these dummy electrodes, selected dummy electrodes are removed using a second mask. The use of the method provides greater flexibility in tailoring individual devices for different objectives.

13 Claims, 18 Drawing Sheets

Related U.S. Application Data of application No. 14/323,914, filed on Jul. 3, 2014, now Pat. No. 9,324,707, which is a division of application No. 13/296,578, filed on Nov. 15, 2011, now Pat. No. 8,809,958, which is a division of application No. 12/839,750, filed on Jul. 20, 2010, now Pat. No. 8,078,998, which is a division of application No. 11/860,955, filed on Sep. 25, 2007, now Pat. No. 7,785,946.

(51) Int. Cl.
| | |
|---|---|
| H01L 21/8234 | (2006.01) |
| H01L 27/02 | (2006.01) |
| G03F 1/00 | (2012.01) |
| H01L 27/082 | (2006.01) |
| H01L 27/085 | (2006.01) |
| H01L 21/033 | (2006.01) |
| H01L 27/088 | (2006.01) |
| H01L 29/66 | (2006.01) |
| H01L 29/78 | (2006.01) |

(52) U.S. Cl.
CPC .......... *H01L 21/28123* (2013.01); *H01L 21/823425* (2013.01); *H01L 21/823437* (2013.01); *H01L 27/0207* (2013.01); *H01L 27/082* (2013.01); *H01L 27/085* (2013.01); *H01L 27/088* (2013.01); *G06F 2217/12* (2013.01); *H01L 29/6659* (2013.01); *H01L 29/7833* (2013.01); *Y10T 29/41* (2015.01)

(56) References Cited

U.S. PATENT DOCUMENTS

| | | | |
|---|---|---|---|
| 5,604,367 | A | 2/1997 | Yang |
| 5,821,014 | A | 10/1998 | Chen et al. |
| 6,258,493 | B1 | 7/2001 | Wang et al. |
| 6,421,820 | B1 | 7/2002 | Mansfield et al. |
| 6,734,762 | B2 | 5/2004 | Cornett et al. |
| 6,777,147 | B1 | 8/2004 | Fonseca et al. |
| 6,787,469 | B2 | 9/2004 | Houston et al. |
| 6,870,230 | B2 | 3/2005 | Matsuda |
| 6,929,887 | B1 | 8/2005 | Lin et al. |
| 7,495,294 | B2 | 2/2009 | Higashitani |
| 7,700,993 | B2 | 4/2010 | Cai et al. |
| 7,868,372 | B2 | 1/2011 | Chen et al. |
| 2001/0020878 | A1 | 9/2001 | Speidell et al. |
| 2003/0237069 | A1* | 12/2003 | Mohan ............... G06F 17/5068 716/55 |
| 2004/0063038 | A1 | 4/2004 | Shin et al. |
| 2004/0068712 | A1 | 4/2004 | Heng et al. |
| 2004/0099924 | A1 | 5/2004 | Nakata |
| 2004/0175909 | A1 | 9/2004 | Matsumoto |
| 2005/0216873 | A1 | 9/2005 | Singh et al. |
| 2006/0199284 | A1 | 9/2006 | Yomogita |
| 2006/0264001 | A1 | 11/2006 | Tran et al. |
| 2006/0277521 | A1 | 12/2006 | Chen et al. |
| 2008/0014684 | A1 | 1/2008 | Blatchford et al. |
| 2008/0224207 | A1 | 9/2008 | Sakamoto et al. |
| 2008/0224221 | A1 | 9/2008 | Yang et al. |
| 2009/0013295 | A1 | 1/2009 | Ji |
| 2016/0283635 | A1 | 9/2016 | Haffner et al. |

OTHER PUBLICATIONS

Meiring, J.E., et al.; "ACLV Driven Double-Patterning Decomposition with Extensively Added Printing Assist Features (PrAFs)," Hopewell Junction, NY; 1983, 12 pages.

Miller, S., et al.; "Lithography Value Drivers in IC Design & Manufacturing," Semiconductor Fabtech; 30th Edition; pp. 76-83.

Rabkin, P., et al.; "Fabless/Foundry DFM: 45nm and Beyond," Semiconductor Fabtech; 32nd Edition; pp. 76-82.

\* cited by examiner

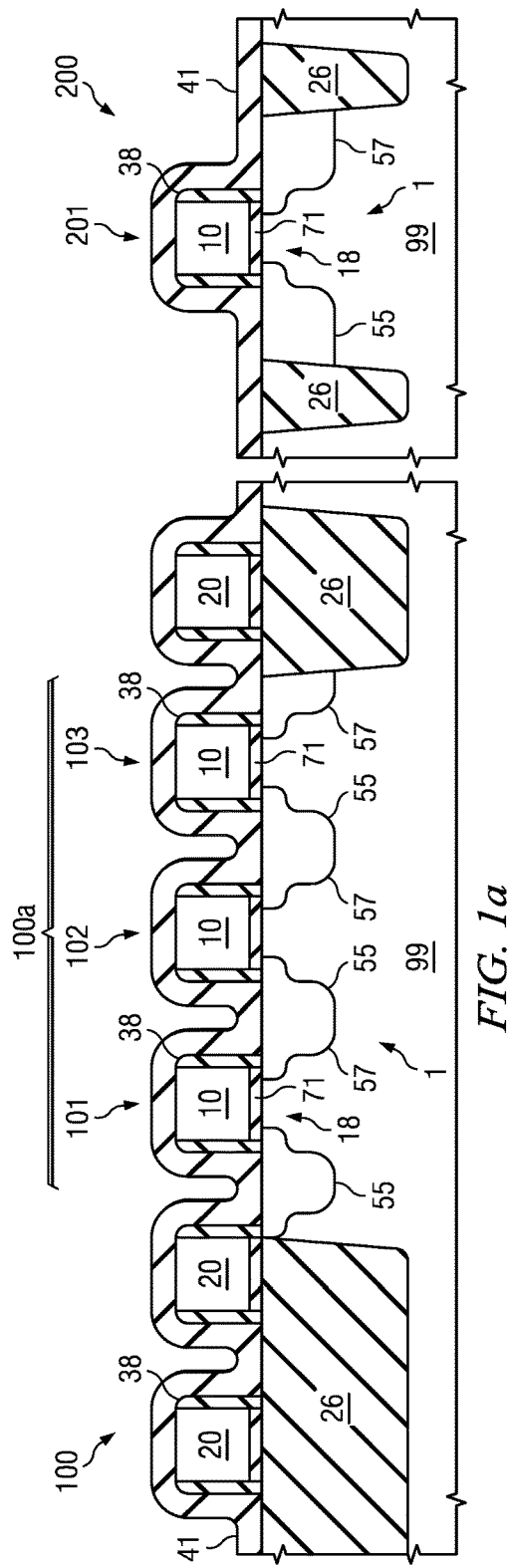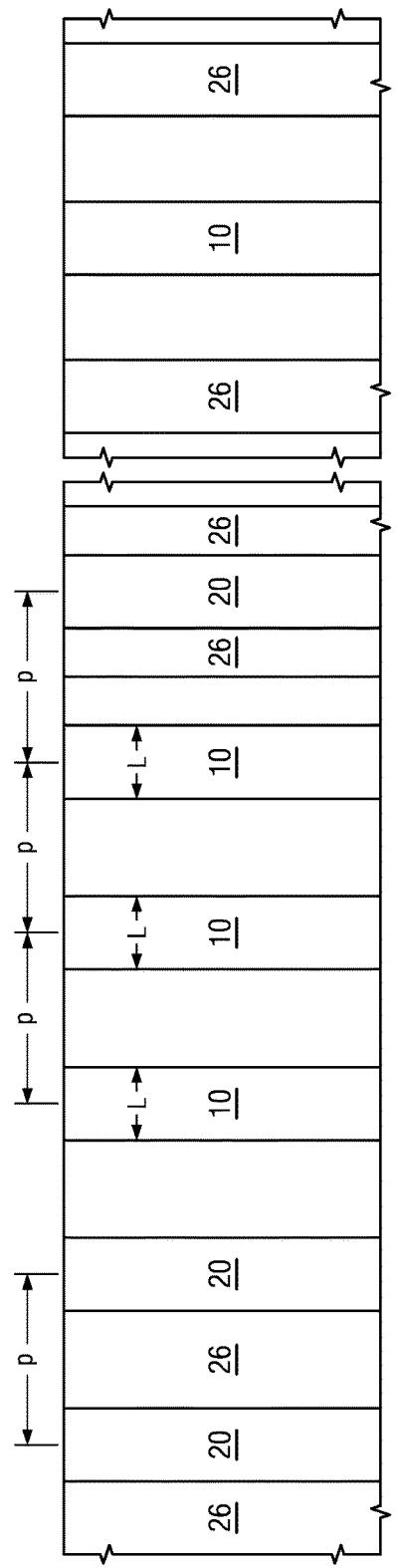

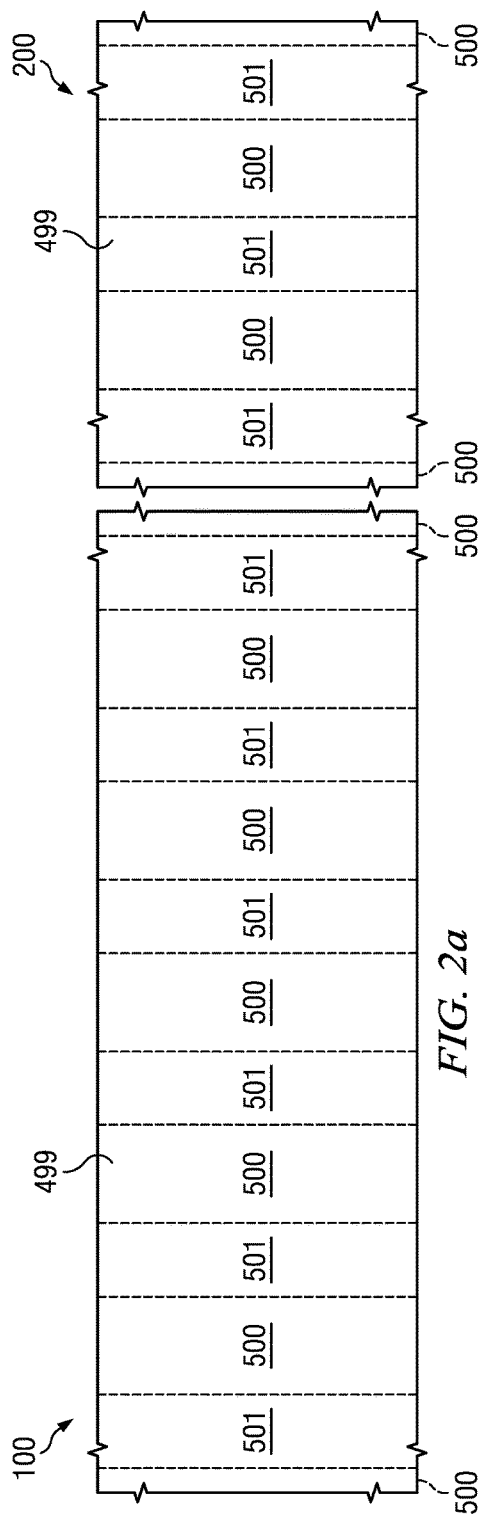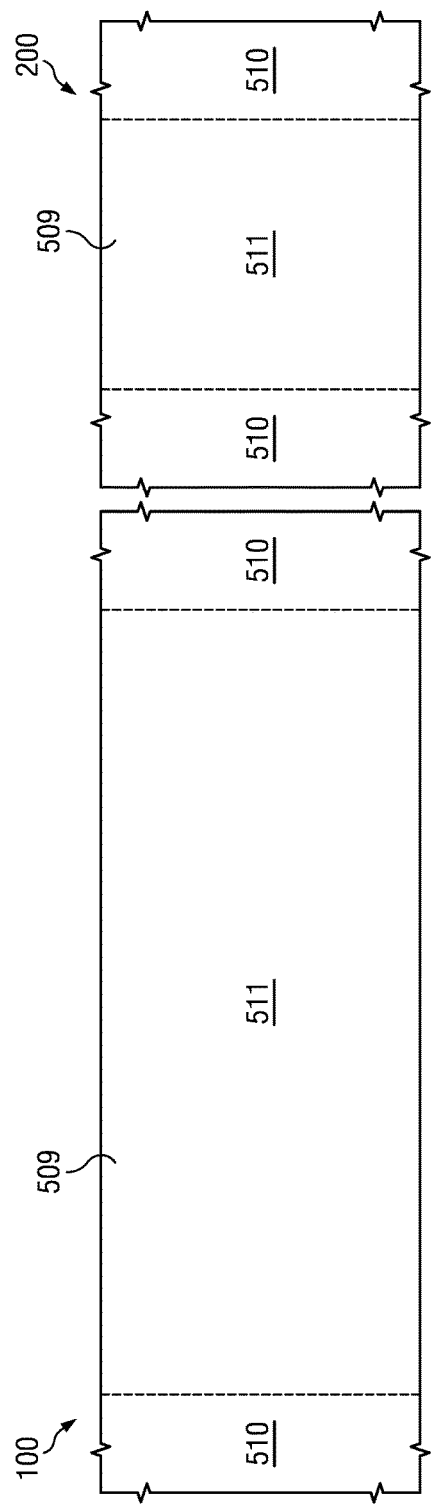

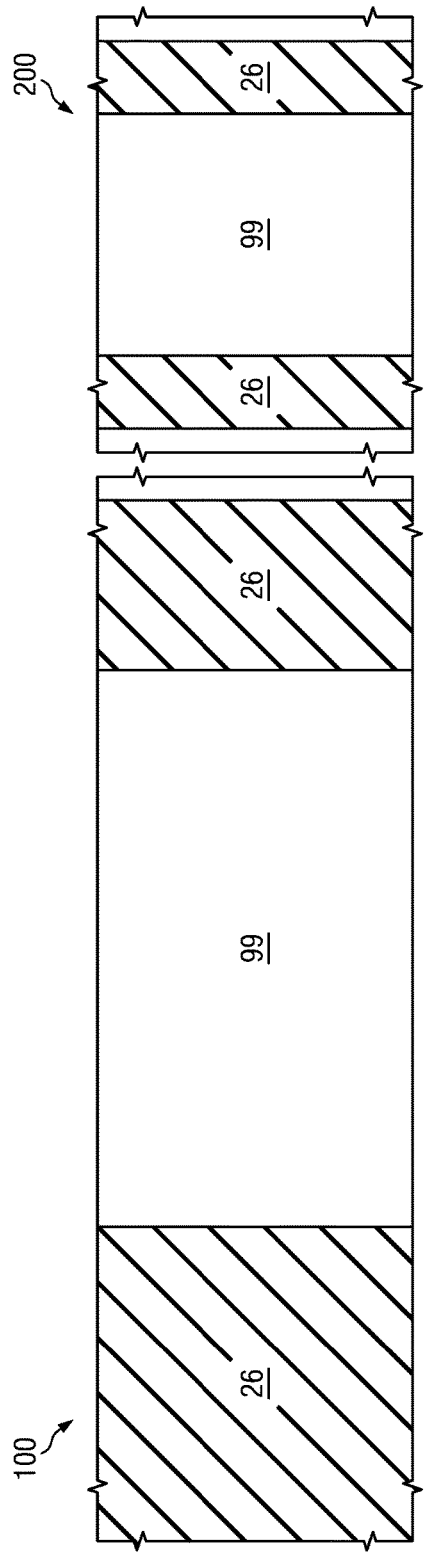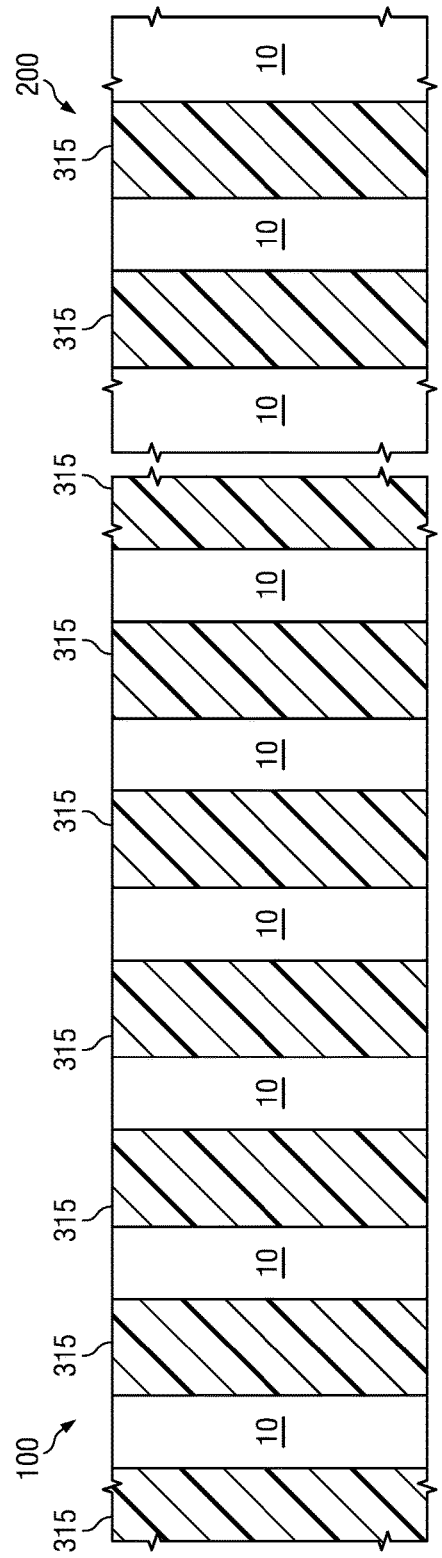
FIG. 4a
FIG. 4b

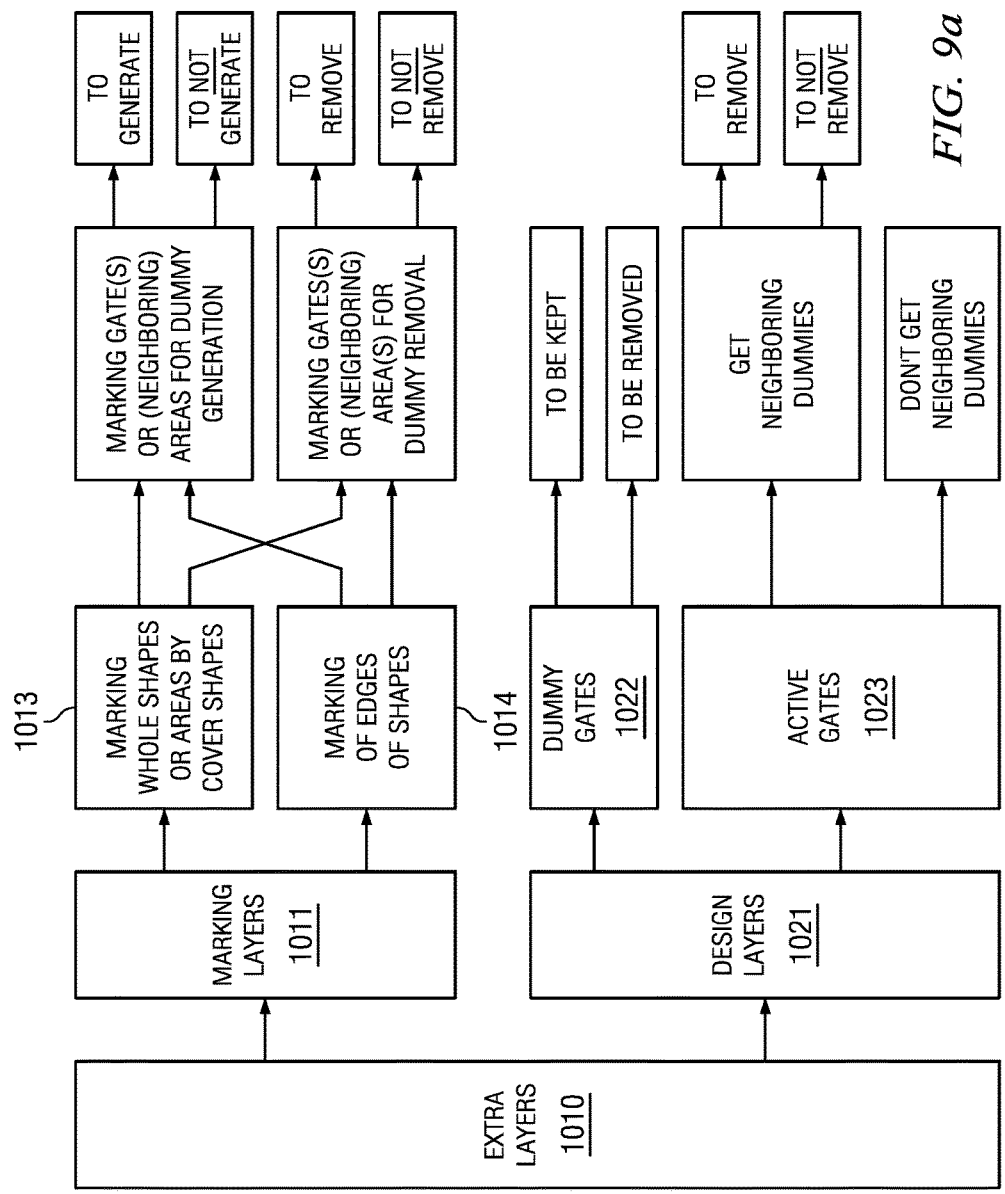

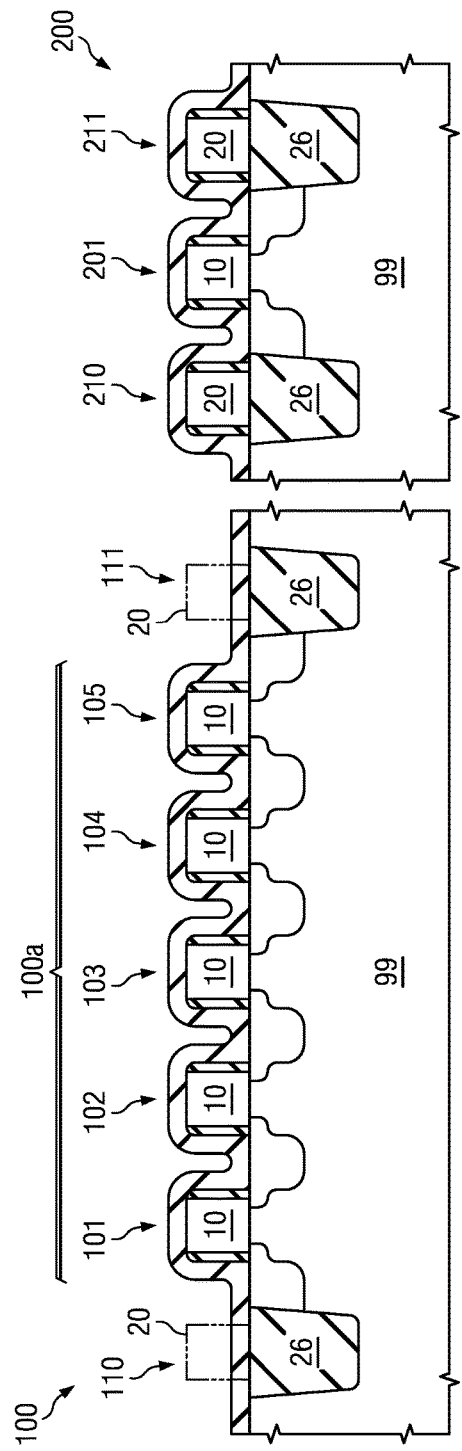
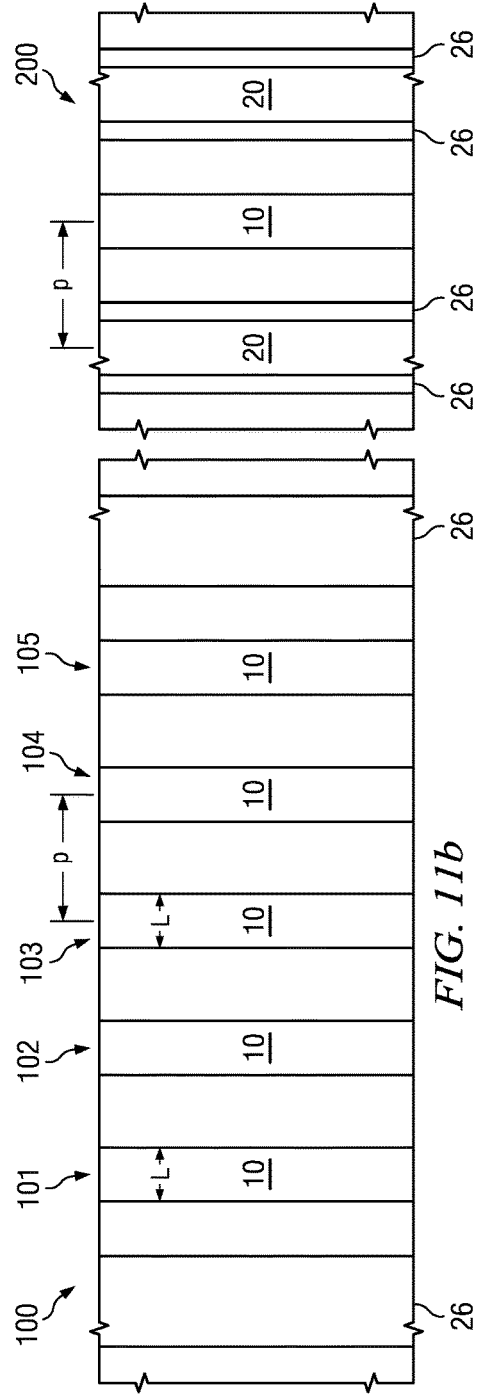
FIG. 11a
FIG. 11b

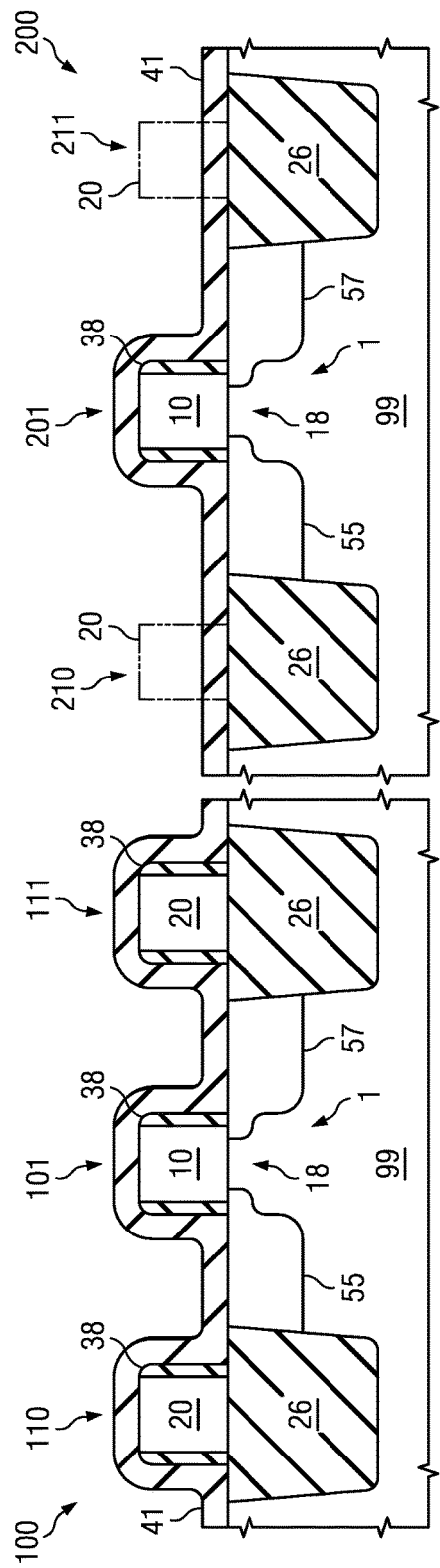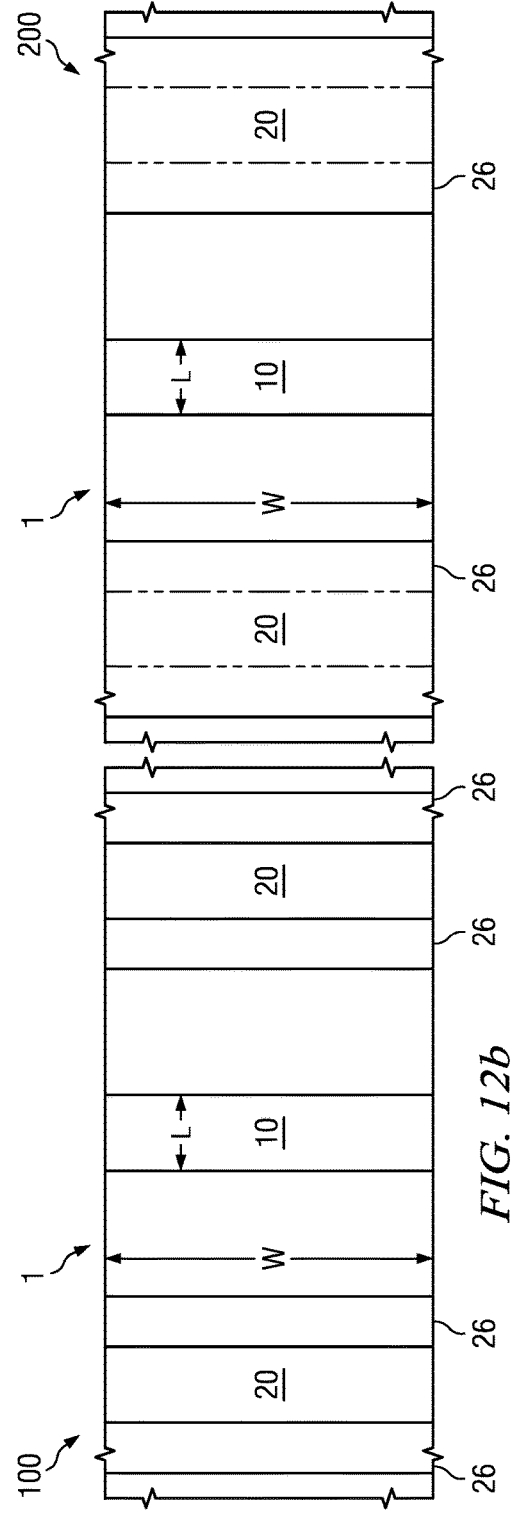

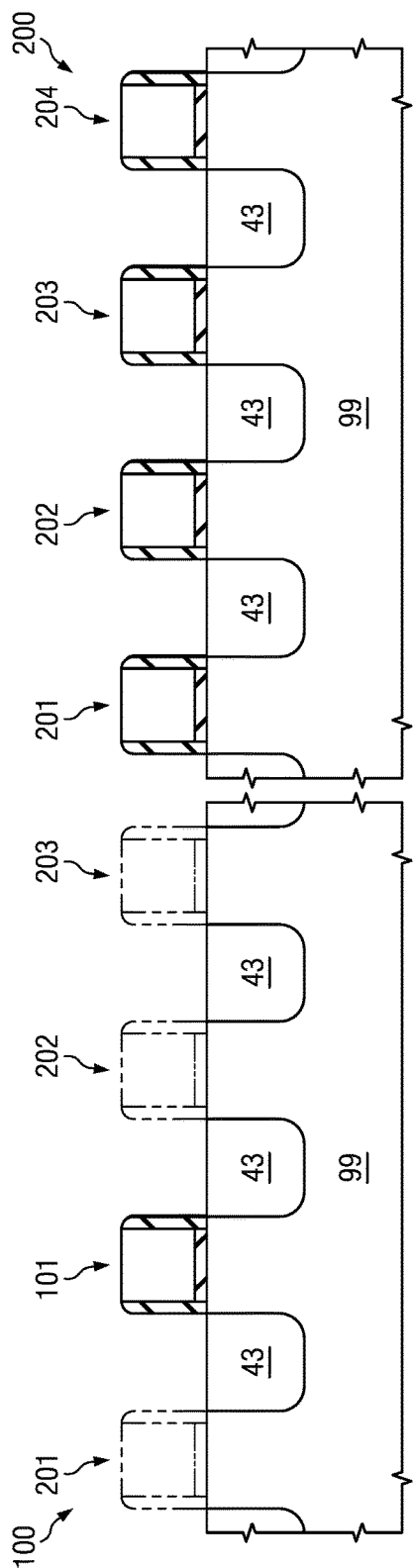
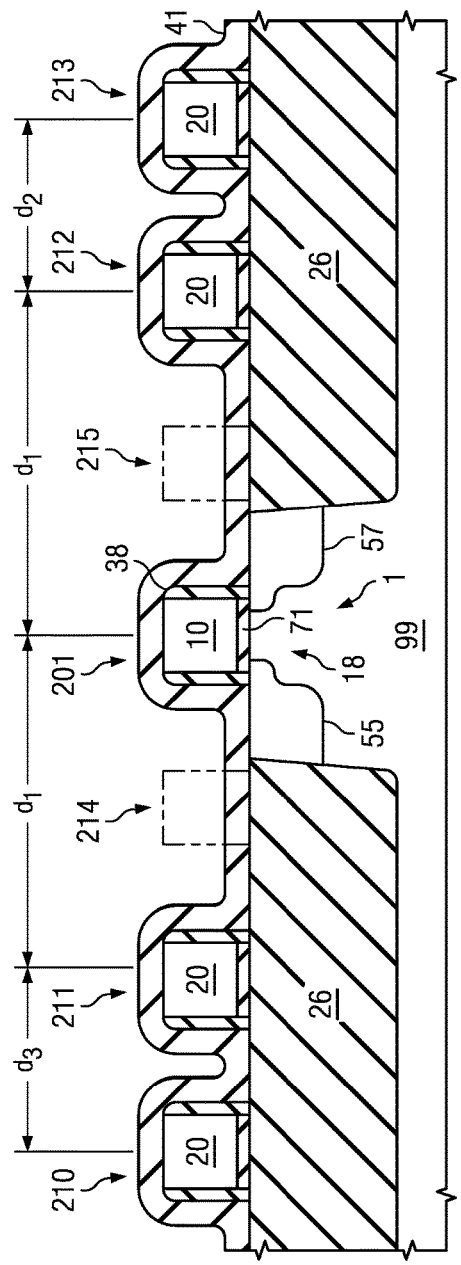
FIG. 14
FIG. 15a

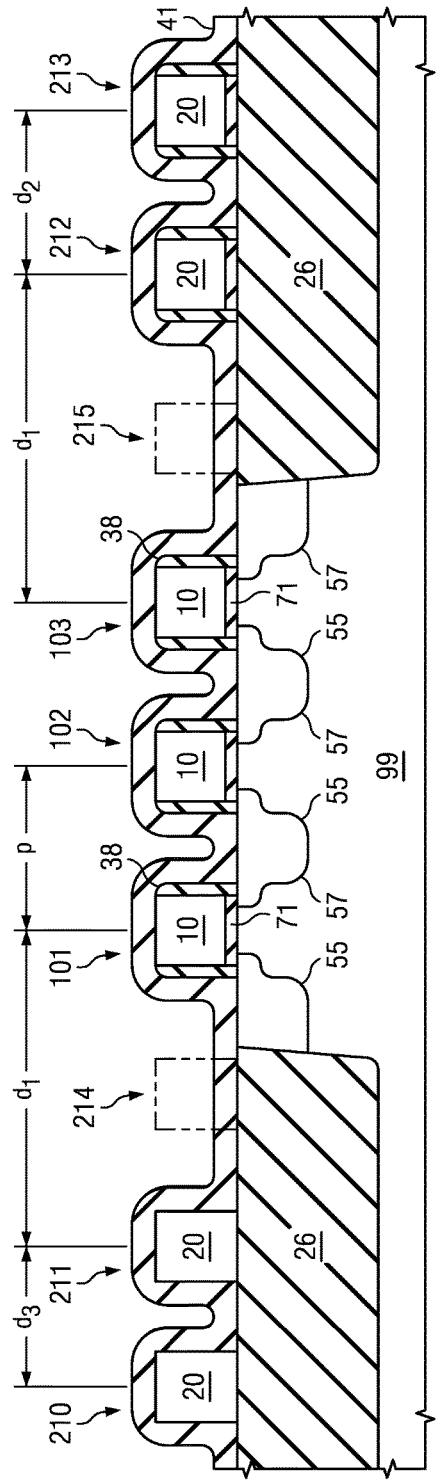
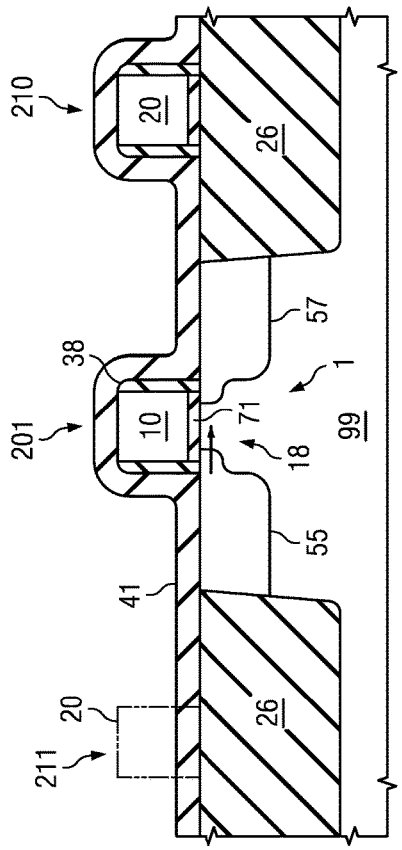

INTEGRATED CIRCUITS AND METHODS OF DESIGN AND MANUFACTURE THEREOF

CROSS-REFERENCE TO RELATED APPLICATIONS

This application is a divisional patent application Ser. NO. of patent application Ser. No. 15/093,646, entitled "Integrated Circuits and Methods of Design and Manufacture Thereof," filed on Apr. 7, 2016, which is a divisional of patent application Ser. No. 14/323,914, entitled "Integrated Circuits and Methods of Design and Manufacture Thereof," filed on Jul. 3, 2014 and issued as U.S. Pat. No. 9,324,707 on Apr. 26, 2016, which is a divisional of patent application Ser. No. 13/296,578, entitled "Integrated Circuits and Methods of Design and Manufacture Thereof," filed on Nov. 15, 2011 and issued as U.S. Pat. No. 8,809,958 on Aug. 19, 2014, which is a divisional of patent application Ser. No. 12/839,750, entitled "Integrated Circuits and Methods of Design and Manufacture Thereof," filed on Jul. 20, 2010 and issued as U.S. Pat. No. 8,078,998 on Dec. 13, 2011, which is a divisional application of patent application Ser. No. 11/860,955, entitled "Integrated Circuits and Methods of Design and Manufacture Thereof," filed on Sep. 25, 2007 and issued as U.S. Pat. No. 7,785,946 on Aug. 31, 2010, all of which applications are hereby incorporated herein by reference.

TECHNICAL FIELD

The present invention relates generally to the fabrication of integrated circuits, and more particularly to fabrication of semiconductor devices using lithography techniques.

BACKGROUND

Generally, semiconductor devices are used in a variety of electronic applications, such as computers, cellular phones, personal computing devices, and many other applications. Home, industrial, and automotive devices that in the past comprised only mechanical components now have electronic parts that require semiconductor devices, for example.

Semiconductor devices are manufactured by depositing many different types of material layers over a semiconductor workpiece or wafer, and patterning the various material layers using lithography. The material layers typically comprise thin films of conductive, semi-conductive and insulating materials that are patterned and etched to form integrated circuits (ICs). There may be a plurality of transistors, memory devices, switches, conductive lines, diodes, capacitors, logic circuits, and other electronic components formed on a single die or chip, for example.

There is a trend in the semiconductor industry towards reducing the size of features, e.g., the circuits, elements, conductive lines, and vias of semiconductor devices, in order to increase performance of the semiconductor devices, for example. The minimum feature size of semiconductor devices has steadily decreased over time. However, as features of semiconductor devices become smaller, it becomes more difficult to pattern the various material layers because of diffraction and other effects that occur during a lithography process. For example, key metrics such as resolution and depth of focus of the imaging systems may suffer when patterning features at small dimensions.

Innovative process solutions have been developed that overcome some of these limitations. However, many such process solutions also interact with subsequent steps and may degrade other equally important factors.

For example, another goal of the semiconductor industry is to continue increasing the speed of individual devices. Enhancing mobility of carriers in the semiconductor device is one way of improving device speed. One technique to improve carrier mobility is to strain (i.e., distort) the semiconductor crystal lattice near the charge-carrier channel region. Transistors built on strained silicon, for example, have greater charge-carrier mobility than those fabricated using conventional substrates.

One technique to strain silicon is to introduce stressor materials. Stressor materials exert strain on the channel of a device by various means. Examples of such methods include lattice mismatch, thermal expansion mismatch during thermal anneal, and/or intrinsic film stress. A typical transistor fabricated today comprises all these elements. The use of SiGe source/drain regions is an example of using lattice mismatch for producing strain. Examples of thermal mismatch and film stress include stress memorization layers and contact etch stop layers.

One challenge with strain techniques arises from their layout effects. Channel strain not only depends on the stressor material, but also on the location and placement of these materials. Hence, any modifications made for example, in the printing of these features during the lithography steps can seriously impact transistor performance and hence product performance.

Solving such interactions requires cross-functional development with information and knowledge sharing between different organizations. What are needed in the art are methods of leveraging lithography to enhance design and manufacturing processes.

SUMMARY

These and other problems are generally solved or circumvented, and technical advantages are generally achieved, by preferred embodiments of the present invention which provide integrated circuits, and methods of design and manufacture thereof.

In accordance with an embodiment of the present invention, a method of manufacturing an integrated circuit includes depositing a gate material on a semiconductor substrate and using a first mask to pattern the gate material, thereby forming a plurality of first and second features. The first features form gate electrodes of the semiconductor devices, whereas the second features comprise dummy electrodes. Selected second features are removed using a second mask based on their location.

The foregoing has outlined rather broadly features of embodiments of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims

BRIEF DESCRIPTION OF THE DRAWINGS

For a more complete understanding of the present invention, and the advantages thereof, reference is now made to the following descriptions taken in conjunction with the accompanying drawings, in which:

FIGS. 1a and 1b illustrate an embodiment of an integrated circuit, wherein FIG. 1a illustrates a cross-sectional view and FIG. 1b illustrates a top view;

FIGS. 2a and 2b illustrate top views of lithography mask layers in accordance with an embodiment of the present invention, wherein FIG. 2a illustrates a first mask layer and FIG. 2b illustrates a second mask or erase mask layer;

FIGS. 4a-4c illustrate top views of a region of an integrated circuit during various process steps of manufacturing using embodiments of the invention;

FIGS. 9a-9c illustrate a flow chart of embodiments of the invention in generating a layout for implementing the selective double patterning technique, wherein FIG. 9a illustrates a layer based description, FIG. 9b illustrates a rules-based description, and FIG. 9c illustrates a models-based description;

FIGS. 11a-11b illustrate an embodiment of an integrated circuit manufactured using embodiments of the invention, wherein FIG. 11a illustrates the cross-sectional view and FIG. 11b illustrates the top view;

FIGS. 12a-12b illustrate an embodiment of an integrated circuit manufactured in accordance with embodiments of the invention, wherein FIG. 12a illustrates the cross-sectional view and FIG. 12b illustrates the top view;

FIG. 14 shows a cross-sectional view of an embodiment of an integrated circuit manufactured in accordance with embodiments of the invention;

FIGS. 15a-15b illustrate cross-sectional views of embodiments of an integrated circuit manufactured in accordance with embodiments of the invention, wherein each embodiment illustrates a local variation in the placement of dummy features, wherein FIG. 15a illustrates an isolated device and FIG. 15b illustrates a dense device; and FIGS. 16a-16b show cross-sectional views of a region of the integrated circuit during various process steps of manufacturing in embodiments of the invention, wherein each embodiment illustrates an alternate use of a selective double patterning technique in forming asymmetric devices.

Corresponding numerals and symbols in the different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 3A:
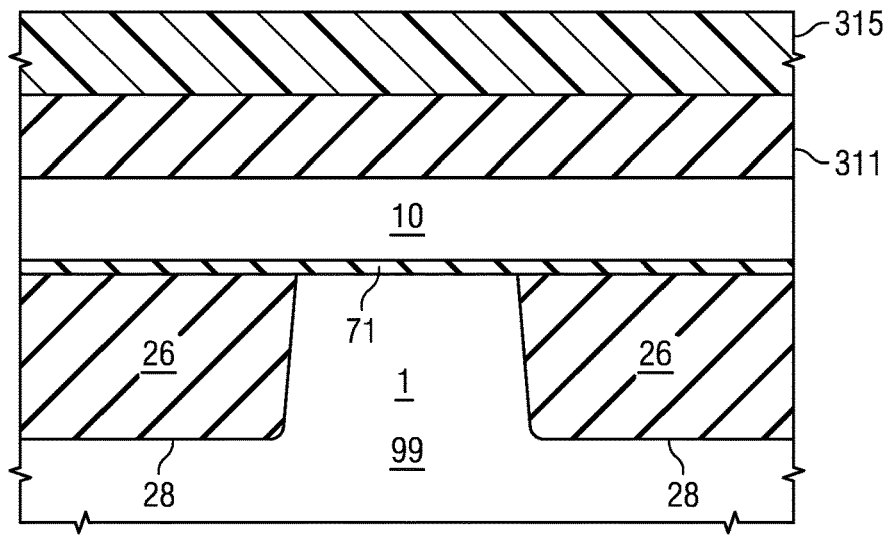
FIGS. 3a-3h illustrate cross-sectional views of a region of an integrated circuit during various process steps of manufacturing using embodiments of the invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A phenomenon referred to as proximity effect poses a primary challenge in transferring patterns during lithography. Proximity effects result in variation of line width of patterns, depending on the proximity of a feature to other features. Proximity effects arise during, for example, imaging, resist patterning, or subsequent transferring of the pattern, such as during etching. To first order, the magnitude of the effect typically depends on the proximity or closeness of the two features present on the mask. However, proximity effects can extend to longer distances extending to several micrometers especially for etch processes.

One of the reasons for the observed proximity effects arises from optical diffraction. Hence, adjacent features interact with one another to produce pattern-dependent variations. For example, for lithographic exposure, closely-spaced dark features (densely packed gates) tend to be wider into a positive tone resist than widely-spaced features (for example isolated gates), although on a lithography mask they comprise the same dimension. Similarly, during etch processes, the reverse is true, and hence closely-spaced features tend to be transferred smaller than widely-spaced features. It is important in many semiconductor device designs for features to have uniform, predictable dimensions across a surface of a wafer, for example, to achieve the required device performance.

To compensate for such proximity effects, optical proximity corrections (OPC) are applied to mask layouts of lithographic photomasks, which may involve adjusting the widths or lengths of the lines on the mask. Advanced methods of OPC correct corner rounding and a general loss of fidelity in the shape of features by adding small secondary patterns referred to as serifs to the patterns.

Finally, sub resolution assist features, also called scatter bars, are also added, which are features formed on the mask but are not patterned or printed. For example, sub resolution assist features typically comprise a plurality of lines significantly thinner than the minimum patternable width or resolution of the exposure tool. These assist features effectively change the pattern density and help improve depth of focus of the exposure system. Consequently, these assist features improve uniformity in printing features of different density for example, between isolated and dense lines.

The use of scatter bars, however, is becoming increasingly difficult to implement. For example, the width of the scatter bars must be significantly smaller than the critical dimension of the minimum feature to avoid printing. Shrinking the critical dimension also requires shrinking the widths of scatter bars. Thus, increasing the difficulty of incorporating these features into the mask as well as their subsequent inspection and repairs.

Further, the patterning of ever shrinking minimum features and especially pitches requires aggressive increases in numerical aperture of the lithography system. Although higher numerical aperture increases resolution, the depth of focus degrades considerably. Consequently, the inclusion of sub resolution assist features is not sufficient to improve depth of focus to a reasonable range suitable for production of future semiconductor nodes. However, further improvements in depth of focus can be made if the sub resolution assist features are allowed to print. Such features, also called printing assist features, are now being explored.

Printing assist features, also called dummy gates, are typically introduced in the layout to improve the quality of the transfer of neighboring, electrically active gates. These dummy gates would be transferred to the final chip layout on the wafer just like the neighboring, electrically active gates. For example, additional gate lines may be printed, for example, over isolation regions. Such dummy gate lines reduce the difference in pitch between wider and narrower pitch structures. However, the use of such dummy features introduces drawbacks due to the presence of these structures in the final layout or produced chip. For example, the presence of these additional dummy structures may in some cases reduce the electrical performance of the chip.

Another method of advantageously using printing assisted features is provided by a technique called double patterning. In double patterning, the mask contains a number of additional features. These additional features such as dummy gate lines are printed along with critical features. The additional features, however are removed in a subsequent process step by exposing these additional features to a second mask step.

The use of printing assist features enables optimization of lithography process conditions to increase the common process window. For example, densely packed gates can be patterned in regions assigned to form both isolated transistors and densely packed transistor arrays. Hence, the isolated transistor region comprises the active gate line and a plurality of printing assist features or dummy gate lines. The isolated transistors are subsequently formed by the removal of these dummy gate lines.

In the typical double patterning process, all the additional features are removed during the second process step. However, in some cases, it might be better to selectively remove some of these additional features. For example, channel strain is used to boost performance. As discussed previously, channel strain in turn may depend on gate to gate spacing. Hence, the presence or absence of dummy gate lines may modulate strain in the channel. In most cases, the increase in gate to gate spacing increases channel strain and hence transistor performance. If the sole criterion is to increase channel strain, it would be beneficial to remove all the dummy gate lines. However, many other factors are also important. For example, in structures or circuits containing transistor arrays only the corner or edge transistors are affected. In fact, such edge transistor difference may result in deleterious variation and may not be preferred in some embodiments. Further, a strong strain gradient is created within the silicon moat region. The combination of higher strain along the moat corners along with the high strain gradients may increase propensity to form defects such as dislocations.

Similarly, removal of printing assist features may create other problems such as erosion of process margins due to, for example, loading effects. For example, a number of process steps are pattern density dependent, i.e., they behave differently depending on the local density, for example, of gate lines. Examples of such processes include etch processes particularly wet etch, planarization processes such as chemical mechanical polishing, and deposition processes such as copper electrochemical deposition. Such variation may dramatically increase within wafer variation and in some instances may result in product failure.

Hence, it may be advantageous to selectively remove only a portion of the printing assist features referred to hereafter as a selective double patterning technique. Addition or deletion of printing assist features has to be carefully optimized in view of various factors. One embodiment of this invention is to provide an algorithm to remove printing assist features to maximize impact of strain on circuit or product performance, while minimizing deleterious effects such as process yield.

In various embodiments, the present invention teaches the local modulation in electrical behavior using a selective double patterning technique. These modulations typically are performed along with optimization of other parameters such as layout area, process margin, parametric yield, or process window.

Embodiments of the present invention achieve technical advantages by providing a method to simultaneously increase process yield and product performance using a selective double patterning technique. The present invention will be described with respect to preferred embodiments in a specific context, namely selectively removing printing assist features in field effect devices. The invention may also be applied, however, to other types of devices such as diodes, bipolar junction transistors, thyristors, memory devices such as DRAM, FeRAM, phase change memories, or floating gate devices. Similarly, the invention may also be applied to other types of devices in other applications and other technological fields. Embodiments of the invention may be implemented in many types of semiconductor devices, such as logic, memory, peripheral circuitry, power applications, and other types of semiconductor devices, as examples.

Figure 4C:
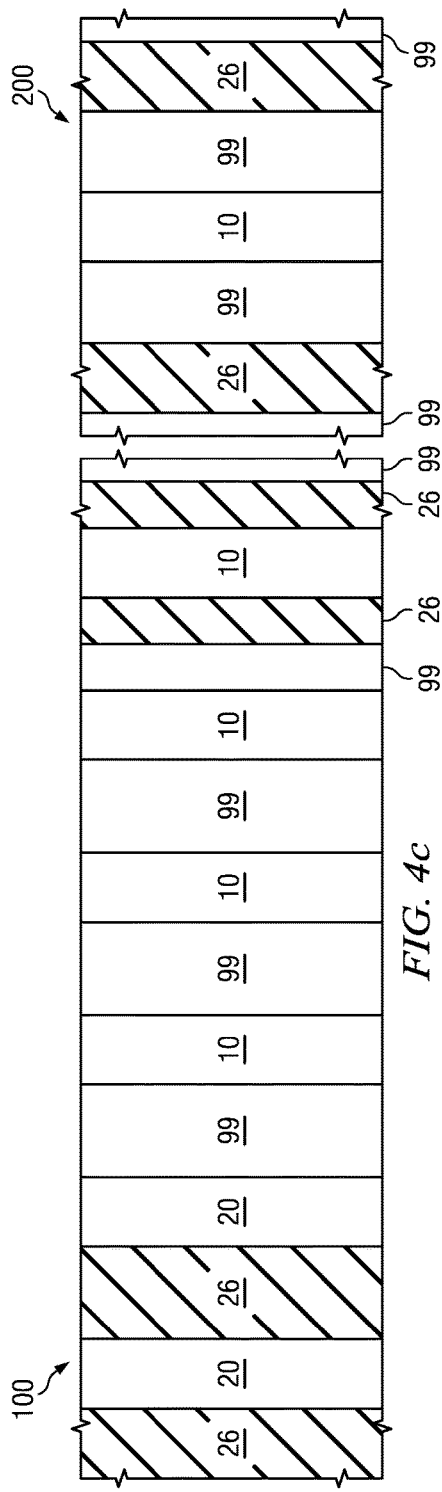
Figure 5:
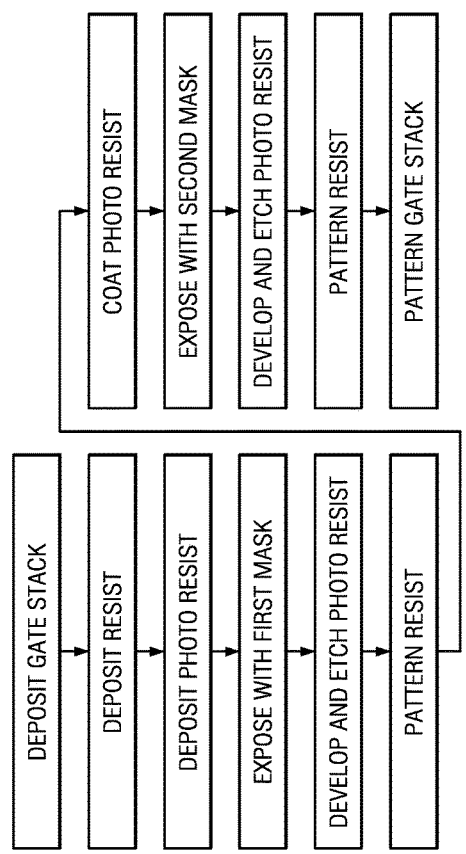
FIG. 5 illustrates a flow chart of the process steps of manufacturing an integrated circuit in accordance with an embodiment of the invention.
Figure 6:
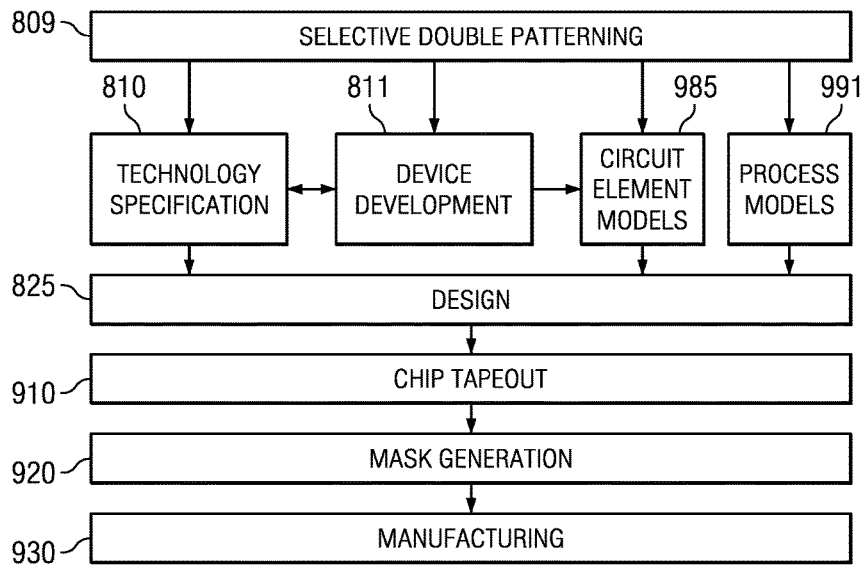
FIG. 6 illustrates a flow chart describing the flow of information in generating a layout in accordance with an embodiment of the invention.
Figure 7:
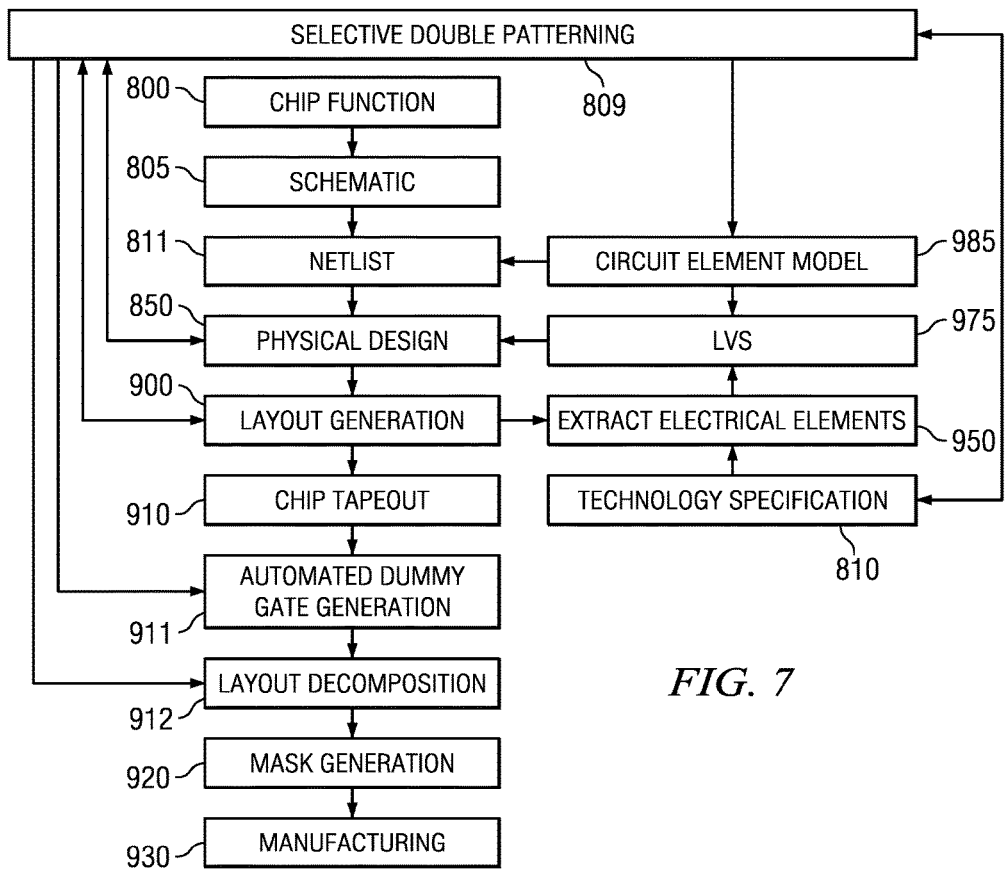
FIG. 7 illustrates a flow chart of an embodiment of the invention in generating a layout.
Figure 8:
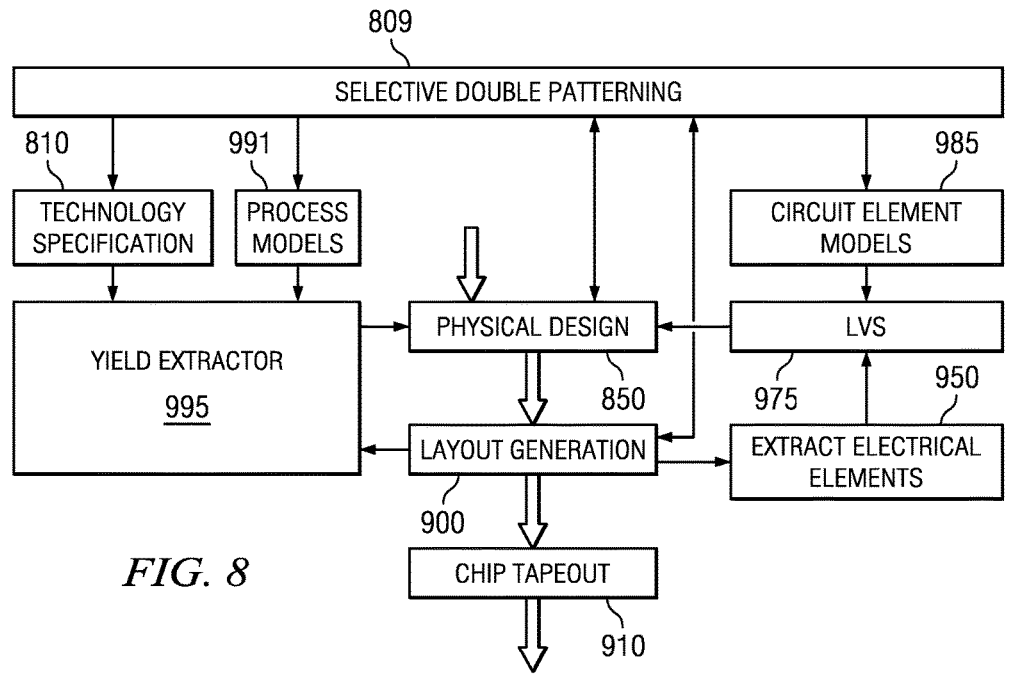
FIG. 8 illustrates a flow chart of an embodiment of the invention in generating a layout.

An exemplary integrated circuit manufactured using embodiments of the current invention is shown in FIG. 1 and various alternate embodiments of the integrated circuit are shown in FIGS. 9-14. An exemplary mask for forming the semiconductor device is shown in FIG. 2. An exemplary method using embodiments of the current invention will then be described with respect to the cross-sectional views of FIGS. 3a-3h and FIGS. 4a-4c, and the flow charts of FIG. 5. FIGS. 6-8 describe embodiments of the current invention describing generation of layout designs of the integrated circuit.

FIGS. 1a and 1b illustrate cross-sectional and top-down views of a semiconductor device manufactured in accordance with a preferred embodiment of the present invention. With reference now to FIG. 1a, the transistor regions 100 and 200 comprise transistor arrays bow containing transistors 101-103 and 201 disposed between isolation regions 26 in a substrate 99. The silicon area of region 200 contains sufficient area for a single transistor also called an isolated transistor. The silicon area of region 100 typically contains a plurality of transistors of a given critical dimension L. The distance p between the transistors in the region 100 determines the pitch. If this distance p approaches the smallest allowed distance for the given technology, the transistors 101-103 are also called minimum pitch transistors. A typical integrated circuit contains both minimum pitch transistors, such as transistors 101-103, and isolated transistors, such as transistor 201.

The transistors 101-103 and 201 comprise channel regions 18 disposed in active regions 1, gate electrodes 10, an isolating material forming isolation regions 26, source/drain regions 55/57, and spacers 38. A strain inducing etch stop layer 41 is present over the source 55, drain 57, gate oxide 71 and gate electrode 10, although this may not be a strain layer in some embodiments. Further, the gate lines 10 are formed adjacent to additional dummy gate regions 20. The dummy gate regions 20 are formed in the first transistor regions 100 but not the second transistor regions 200. The transistors in the two regions 100 and 200 are formed identically except for the presence of the dummy gate regions 20. As will be described using various embodiments, the dummy gates on region 200 have been selectively removed by the selective double patterning technique.

The effective gate pitch defined as the distance between adjacent gate lines (10 to 10) or (10 to 20) defines the strain in the channel region of the transistor. Typically, channel strain decreases as effective pitch is reduced. As the transistors 101 and 201 have different effective gate pitches, they operate at different "ON" currents or electrical performance. The transistor region 200 comprises a large gate pitch and hence is optimized for performance, whereas the transistor region 100 comprises a tight gate pitch and is optimized for process variation arising, for example, from gate density variation.

FIGS. 2a and 2b provide illustrations of a mask used in the selective double patterning process to manufacture, for example, the transistor regions 100 and 200. As discussed earlier, a typical double patterning process comprises a first expose, develop and etch followed by a second expose, develop and etch, forming the final pattern. In particular, FIG. 2a shows the mask layer 499 used in the formation of the first exposure. FIGS. 2a and 2b also show the areas forming the transistor regions 100 and 200. The first exposure comprises openings 500 in the mask exposing the photoresist. The regions 501 are opaque to radiation and hence are not developed. The first exposure is used to pattern gate lines as well as form printing assist features. The illumination conditions are selected to maximize the image quality, for example, minimize across chip line width variation, over a range of process window parameters such as depth of focus, exposure dose and mask error factor.

A second mask, as shown by the second mask level 509 over the transistor regions 100 and 200 exposes regions 510 selectively. The second mask is an erase or cut mask in that it removes selected regions 510. For example, the second mask level 509 contains transparent mask regions 510 and opaque regions 511 that block exposure of any underlying resist. The combination of the first and second exposure results in selectively placed gate lines as shown for example in FIG. 1 or FIGS. 9-13.

By minimizing variation in spacings and openings of printing during the first mask step, variations due to pattern density are minimized. As second mask level 509 is an erase mask, it does not need the stringent requirements as for the first mask level 499.

The mask design has been explained in terms of opaque and transparent regions to clearly describe the embodiments of the invention. However, actual mask design and materials can be chosen to incorporate modifications to improve the imaging system. For example, to improve image resolution, the mask design may comprise attenuated phase shifter materials in regions 501 and transparent materials in region 500 of FIG. 2a. Similarly, to improve depth of focus, the mask design for each layer may comprise OPC features such as hammerheads, serifs, sub resolution assist features, etc. Further, although a positive resist has been assumed, the transistor regions 100 and 200 can be fabricated using a negative resist (the mask design could be suitably adjusted).

FIGS. 3a-3g provide cross-sectional diagrams illustrating a first embodiment method of the present invention using the mask layers 499 and 509 of FIG. 2. FIGS. 4a-4c illustrate an associated top view of the implementation, and FIG. 5 illustrates an associated flow diagram of one implementation of the process. For clarity, the process flows and features of FIG. 3 illustrate only one type of transistor region (e.g., regions 200 of FIG. 1). In FIG. 4, the transistor regions 100 and 200 (e.g., of FIG. 1) will be illustrated at selected process steps. While certain details may be explained with respect to only one of the embodiments, it is understood that these details can also apply to other ones of the embodiments.

Referring first to FIG. 3a, a semiconductor body 99 is provided. In the preferred embodiment, the semiconductor body 99 is a silicon wafer. Some examples of the body 99 are a bulk mono-crystalline silicon substrate (or a layer grown thereon or otherwise formed therein), a layer of (110) silicon on a (100) silicon wafer, a layer of a silicon-on-insulator (SOI) wafer, or a layer of a germanium-on-insulator (GeOI) wafer. In other embodiments, other semiconductors such as silicon germanium, germanium, gallium arsenide, indium arsenide, indium gallium arsenide, indium antimonide or others can be used with the wafer.

In the first embodiment, isolation trenches 28 are formed in the semiconductor body 99 as shown in FIG. 3a. The isolation trenches 28 can be formed using conventional techniques. The trenches 28 define active area 1, in which integrated circuit components can be formed. The trenches 28 are then filled with an isolating material forming isolation regions 26. The trench fill can be a single material or multiple materials. Examples of trench fill materials include oxides such as thermal oxide, High Density Plasma (HDP) oxide, HARP oxide, TEOS oxides and various nitrides. In other embodiments, other trench filling processes can be used. For example, while the trench is typically lined, this step can be avoided with newer fill materials (for example HARP™). The top surface of the semiconductor body 99 is subsequently polished and planarized. Chemical mechanical polishing (CMP) is a specific example of the polishing process.

This completes the formation of the isolation regions 26. The top view cross section of transistor regions 100 and 200 are shown at this stage of the fabrication process in FIG. 4a.

FIG. 3a shows the device after gate stack deposition. After STI formation, well, punch through and threshold implants are performed. A gate dielectric 71 is deposited over exposed portions of the semiconductor body 99. In one embodiment, the gate dielectric 71 comprises an oxide (e.g., $SiO_2$), a nitride (e.g., $Si_3N_4$), or a combination of oxide and nitride (e.g., SiON, or an oxide-nitride-oxide sequence). In other embodiments, a high-k dielectric material having a dielectric constant of about 5.0 or greater is used as the gate dielectric 71. Suitable high-k materials include $HfO_2$, $HfSiO_x$, $Al_2O_3$, $ZrO_2$, $ZrSiO_x$, $Ta_2O_5$, $La_2O_3$, nitrides thereof, $HfAlO_x$, $HfAlO_xN_{1-x-y}$, $ZrAlO_x$, $ZrAlO_xN_y$, $SiAlO_x$, $SiAlO_xN_{1-x-y}$, $HfSiAlO_x$, $HfSiAlO_xN_y$, $ZrSiAlO_x$, $ZrSiAlO_xN_y$, combinations thereof, or combinations thereof with $SiO_2$, as examples. Alternatively, the gate dielectric 71 can comprise other high-k insulating materials or other dielectric materials. As implied above, the gate dielectric 71 may comprise a single layer of material, or alternatively, the gate dielectric 71 may comprise two or more layers.

The gate dielectric 71 may be deposited by chemical vapor deposition (CVD), atomic layer deposition (ALD), metal organic chemical vapor deposition (MOCVD), physical vapor deposition (PVD), or jet vapor deposition (JVD), as examples. In other embodiments, the gate dielectric 71 may be deposited using other suitable deposition techniques. The gate dielectric 71 preferably comprises a thickness of about 10 Å to about 60 Å in one embodiment, although alternatively, the gate dielectric 71 may comprise other dimensions. In the illustrated embodiment, the same dielectric layer would be used to form the gate dielectric 71 for both the p-channel and n-channel transistors. This feature is however not required. In alternate embodiments, p-channel transistors and n-channel transistors could each have different gate dielectrics.

The gate electrode layer 10 is formed over the gate dielectric 71. The gate electrode layer 10 preferably comprises a semiconductor material, such as polysilicon or amorphous silicon, although alternatively, other semiconductor materials may be used for the gate electrode layer 10. In other embodiments, the gate electrode layer 10 may comprise TiN, TiC, HfN, TaN, TaC, W, Al, Ru, RuTa, TaSiN, $NiSi_x$, $CoSi_x$, $TiSi_x$, Ir, Y, Pt, Ti, PtTi, Pd, Re, Rh, borides, phosphides, or antimonides of Ti, Hf, Zr, TiAlN, Mo, MoN, ZrSiN, ZrN, HfN, HfSiN, WN, Ni, Pr, VN, TiW, a partially silicided gate material, a fully silicided gate material (FUSI), other metals, and/or combinations thereof, as examples. In one embodiment, the gate electrode layer 10 comprises a doped polysilicon layer underlying a silicide layer (e.g., titanium silicide, nickel silicide, tantalum silicide, cobalt silicide, or platinum silicide).

The gate electrode layer 10 may comprise a plurality of stacked gate materials, such as a metal underlayer with a polysilicon cap layer disposed over the metal underlayer. A gate electrode layer 10 having a thickness of between about 400 Å to 2000 Å may be deposited using CVD, PVD, ALD, or other deposition techniques.

A resist layer 311 is deposited over the gate electrode layer 10. The resist layer 311 may be either organic or inorganic. Some examples of inorganic resist layer 311 include silicon dioxide, silicon nitride, silicon oxy-nitride, titanium nitride and/or a SILK (silicon-containing low-k) layer. The resist layer 311 may also be an organic layer such as a bottom anti-reflective coating (BARC) layer (such as polymides, and polysulfones), a FLARE layer, and/or a BCB layer. The resist layer 311 may optionally be baked to form a hard baked, thermally or chemically cross-linked resist. Finally, although only a single layer of resist 311 is shown, the resist layer 311 may comprise multiple layers. For example, in some embodiments, the resist layer 311 may be a bilayer or trilayer film comprising different materials.

A photo-resist 315 is deposited on the gate stack. The photo-resist layer 315 is a resist that can be developed by exposure to radiation such as deep UV radiation used by lithography systems. In preferred embodiments, this photo-resist 315 is sensitive to 193 nm or 157 nm electromagnetic radiation. The resist used may either be positive or negative. Examples of resist polymers are poly-p-hydroxystyrene, acrylates, novolak or cycloaliphatic copolymers.

Figure 3B:
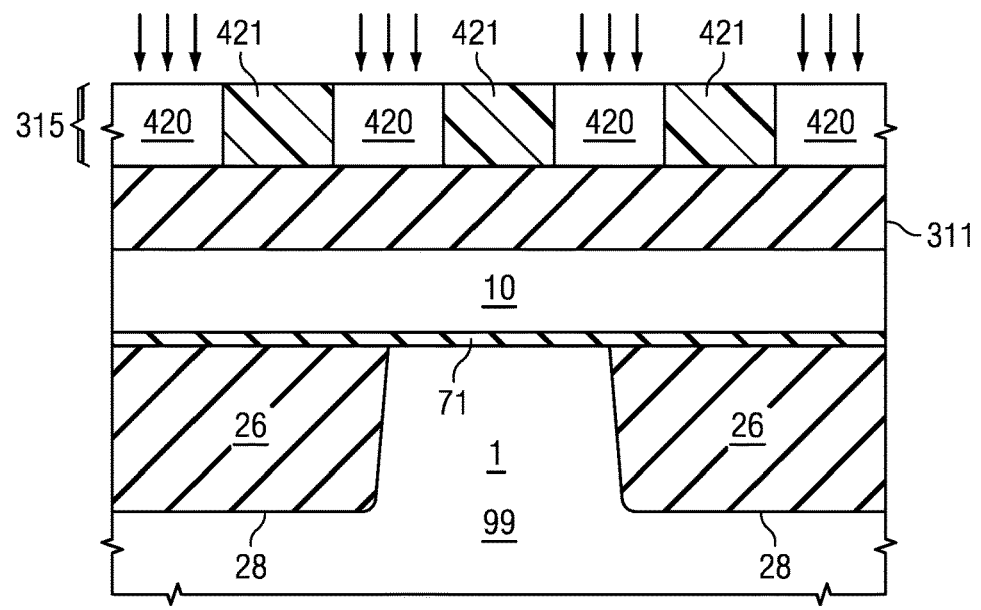

Referring to FIG. 3b, the photo-resist 315 is exposed using the first mask level 499 of FIG. 2a. The first mask level 499 of FIG. 2a comprises the desired gate features, but also includes the additional printing assist features. Thus, regions 420 are exposed whereas regions 421 remain unexposed.

Figure 3C:
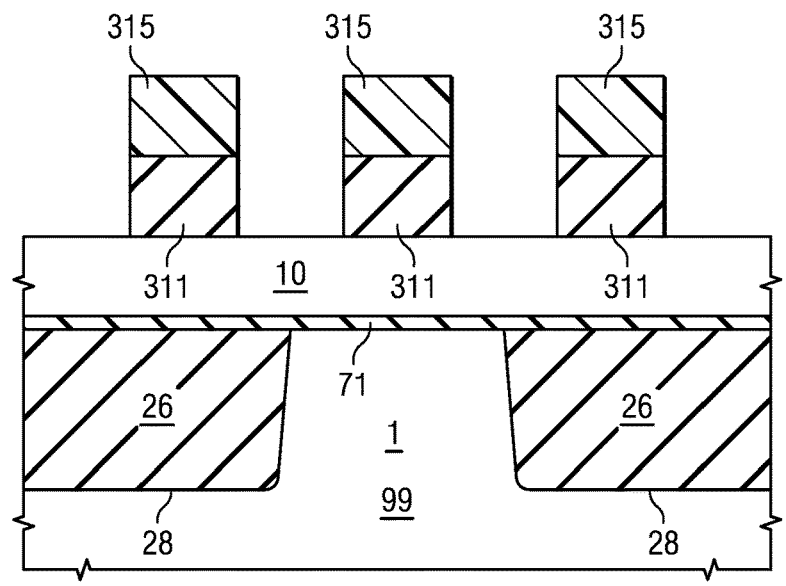

Referring to FIG. 3c, the exposed photo-resist regions 420 are removed by etching. Using the photo-resist regions 421 as patterns, an anisotropic etch such as a reactive ion etch is used to remove the exposed portion of the resist 311. The top views of transistor regions 100 and 200 (e.g., of FIG. 1a) are shown at this stage of the fabrication process in FIG. 4b.

Figure 3D:
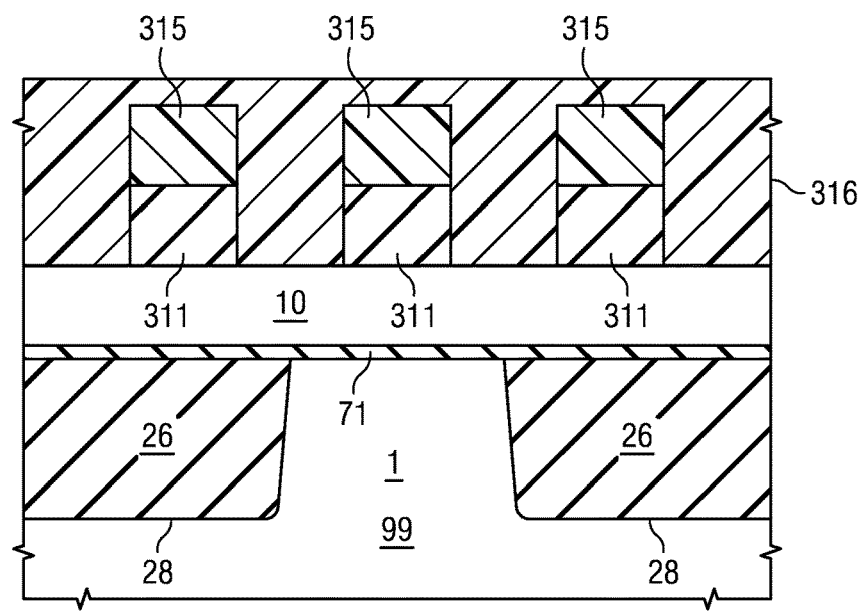
Figure 3E:
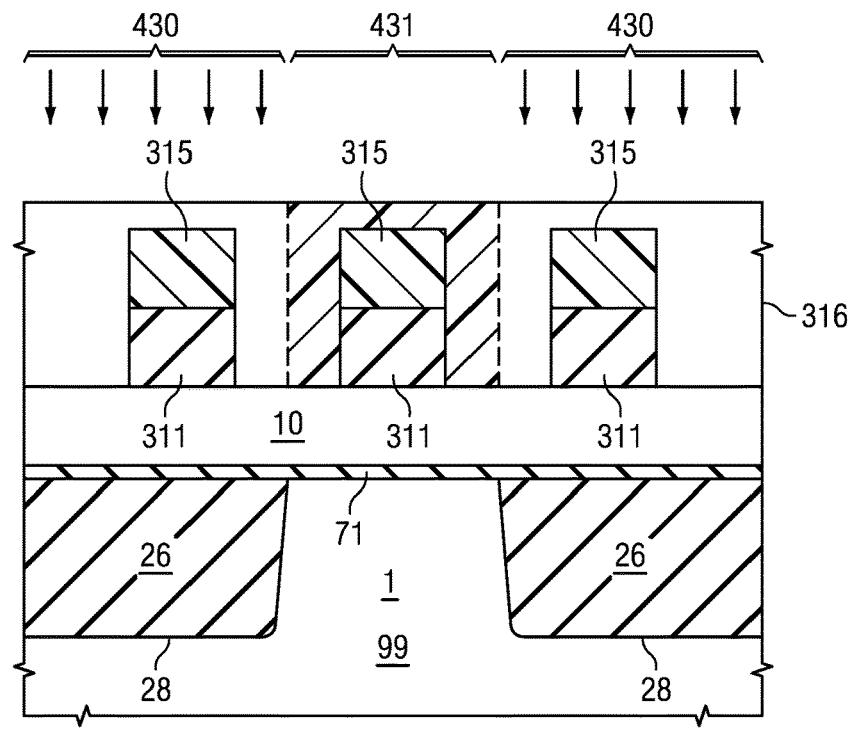

A second photo-resist layer 316 is coated over the semiconductor body 99 covering the exposed gate electrode layer 10 and the photo-resist 315 as shown in FIG. 3d. Referring next to FIG. 3e, the photo-resist 316 is exposed using the second mask level 509 of FIG. 2b forming exposed regions 430 and unexposed regions 431. Although in the current embodiment, the second mask or erase mask is exposed in a process step following the first mask exposure, in alternate embodiments, the second mask step may be performed during subsequent processing. Further, although the second mask step is performed after the first mask step in the current embodiment, the second mask may also be performed before the first mask step in some embodiments.

Figure 3F:
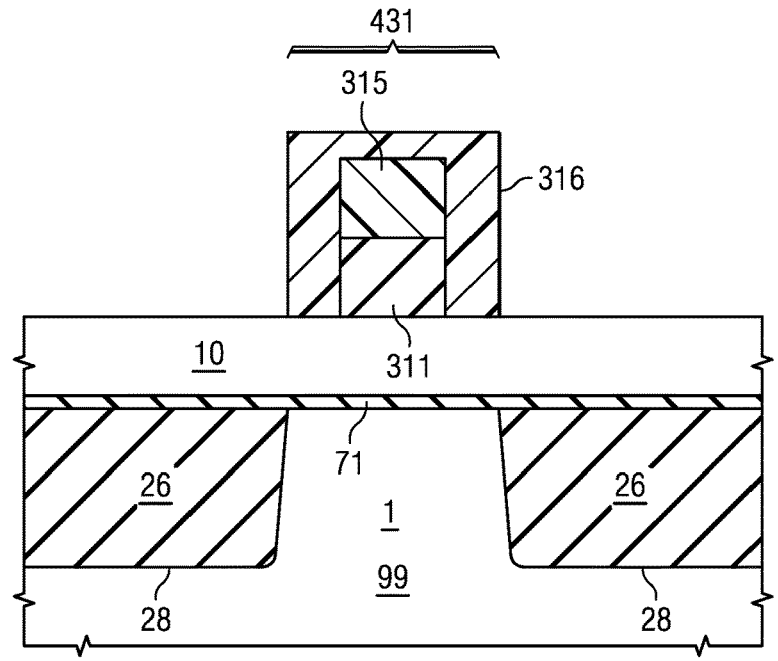
Figure 3G:
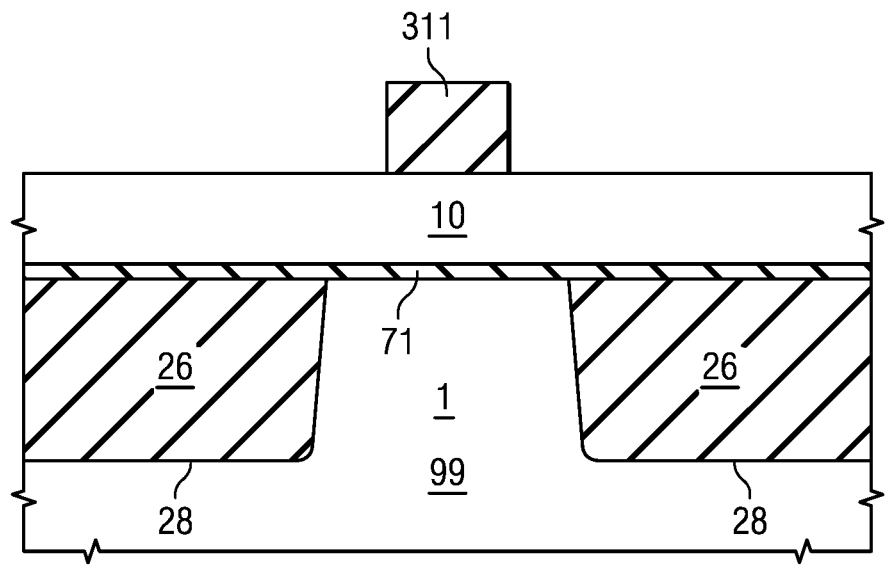
Figure 3H:
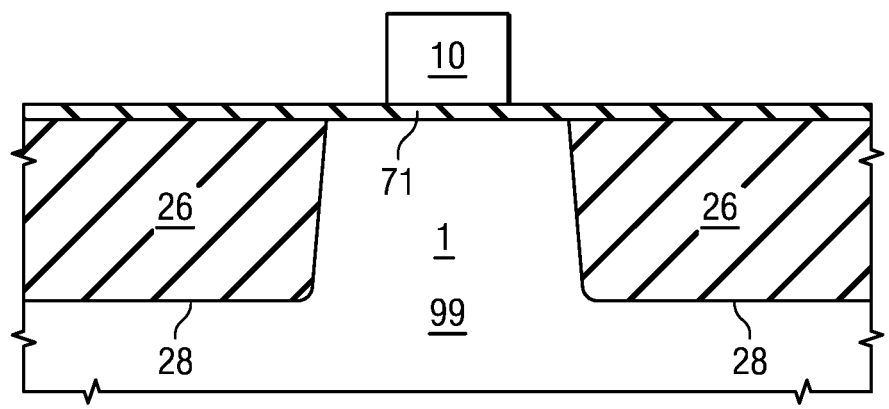

The exposed regions 430 are developed and etched out as shown in FIG. 3f. Further, the resist 311 and photo resist 315 (if remaining) are also etched and removed. As shown in FIG. 3g, the pattern is transferred to gate electrode layer 10 and gate oxide 71 by reactive ion etch. An additional trim etch may be performed at this stage to reduce the critical dimension of the gate lines 10 further, before removal of the top resist layer. Finally, as shown in FIG. 3h, all the resist layers are removed forming the patterned gate electrode line 10.

The top cross-section of the device fabricated at this stage of the processing is shown in FIG. 4c. The device now comprises dummy gate lines 20 and gate lines 10 in transistor region 100. The transistor region 200 comprises only gate lines 10.

After gate stack formation, further processing continues as per conventional flow. For example, spacers, extensions, source/drain regions, silicide regions, contacts and metallization including vias and metal lines may be formed completing the fabrication of the integrated circuit.

An etch step was used in the current embodiment to transfer the image before the second exposure step. In alternate embodiments, the two exposure steps may be performed concurrently without an intermediate etch step. In such embodiments, the final image is formed on the photo-resist by the combination of the first exposure and second exposure processes.

So far, various embodiments have illustrated the semiconductor device and methods for forming the device. Various embodiments exist in the implementation of the selective double patterning method in generating a layout and a mask. In various embodiments illustrated in FIGS. 6-10, a final layout is generated with designs optimally designed for each mask layer of the selective double patterning process.

An embodiment of the design methodology using the selective double patterning in layout design will now be described using the flow chart of FIG. 6. Design 825 and manufacturing 930 comprise two primary aspects of development of an integrated circuit. In its simplest form, a chip is designed by the designer and a layout comprising the functionality is taped out to the manufacturing engineers. The manufacturing engineers in turn take the taped out layout and produce a final chip performing the operation envisioned. The presence of selective double patterning process 809 presents a unique opportunity for designers and manufacturing engineers. For example, at the device level, engineers can use the information on next neighboring dummy line or spacing to optimize a given transistor performance. Similarly, at a circuit level, the layout may be optimized to also include proximity effects arising from interactions of neighboring dummy regions. Such optimizations are possible only by careful flow of information about the selective double patterning technique to engineers doing various operations.

In a modern integrated chip development, design and manufacturing division have several levels of information transferring between them. For example, designers at a block level will perhaps only use high level information regarding the electrical functional of components from the manufacturing group. However, designers involved in physical layout will clearly require much more information. Hence, based on utility, this information flow can be divided into several groups. Only as an example, the information from the selective double patterning technique 809 can be passed onto designers at various levels. For example, the technology specification 810 which could be a design rule document or a description could comprise information regarding the selective double patterning technique 809. For example, this technology specification 810 could include an allowable range of pitches, spacings, and critical dimensions for the first mask level. Similarly, the technology specification 810 could also include an allowable range of overlap between the first and second mask layers to minimize misalignment errors, as well an allowable range of openings. For example, this could be a function of the pitches, openings and spacings allowed for the first mask layer.

Further, device engineers, as well as compact model development engineers, would require information regarding the selective double patterning technique 809. Device engineers could use information regarding the selective double patterning technique 809 to maximize device performance during device development 811. For example, after device development 811, transistor performance from proximity to a dummy gate line or density of dummy gate lines may be characterized into a compact circuit element model 985. As one example, the circuit element model 985 could determine the channel mobility and hence the current voltage characteristics of transistors based on the local strain. The local strain could in turn depend on the density of dummy or contacted gate lines surrounding the given transistor.

Similarly, the available options from the selective double patterning technique may be passed onto process models 991 that extract, for example, product yield models. Such process models 991 could, for example, use the density and dimensions of dummy and active gates in a particular region to calculate potential hot-spots or yield loss regions.

Different design groups can be given the appropriate level of information. Thus, the developed layout at chip tapeout 910 includes a fully optimized product. The final layout can be optimized either for a single component, for example performance, or a combination of factors, for example performance, process yield, process window, etc. The designed layout may be decomposed into different layers such that each layer comprises different designs for each mask step (or exposure). Each of these designs may be properly optimized for all required functionality. Although not discussed, each layer of the design undergoes optical proximity correction, subsequently the layout is sent for mask generation 920.

An embodiment of design methodology using the selective double patterning technique 809 will be described using the flow chart of FIG. 7. In designing integrated circuit chips, information is refined progressively to include more detail until a physical layout is made.

A functional description 800 of a product is progressively transformed into, for example, a schematic 805. The schematic 805 comprises multiple levels, wherein the lowest level is comprised of primitives such as single devices and each upper layer comprises successively complex blocks. For example, the top component of the schematic is a block generally describing the entire circuit at a gross level (i.e. controller, processor, etc.). The schematic 805 is comprised of individual devices such as resistors, transistors, capacitors, switches, etc. and other hierarchical blocks. A database or netlist 811 is then created of the schematic in which every device is listed, along with its properties, connectivity and proper dimensions to verify information (e.g., which device is connected to which other device). The netlist 811 is still an abstract representation of the circuit. For instance, the netlist 811 may be generated with some knowledge of the manufacturing process, for example, from the technology specification 810. It may hence include numerical values for specific resistances, capacitances etc of interconnects, transistors and other devices, to simulate for example a standard cell or product. For example, the netlist 811 may be optimized to deliver a certain delay (performance), active and standby power etc. The netlist 811 is then translated into a layout 900 using physical design 850. Physical design 850 converts the abstract representation into a physical representation. Physical design 850 may include many steps such as floor-planning, place and route, compaction, and clock tree synthesis. A layout 900 of the integrated circuit is created after physical design 850. A state-of-the-art layout 900 includes a collection of many levels of geometrical description of the IC. After the fabrication of the layout, the chip is taped out. The dummy features from the selective double patterning technique 809 are placed after chip tapeout 910 and appropriate masks are generated. The masks are subsequently sent for manufacturing.

The transformation applied at each level in the design flow is generally verified. The layout 900 is rigorously tested and verified to satisfy all metrics. Such verification can include functional correctness and timing, among other performance metrics such as power consumption. An extraction tool 950 reads the designed layout 900 to extract circuit elements, their electrical connectivity, and their parasitics. A procedure called layout-versus-schematic (LVS) 975 takes this information along with circuit element models 985 to determine the functionality of the layout 900. This layout functionality is compared with the functionality of the schematic 805 or netlist 811 to determine the validity of the design. These processes may be iteratively performed until all conditions are satisfied.

Both the physical design 850 and the LVS 975 tools can utilize information from the selective double patterning technique 809 either directly, or as a rule or a model in the technology specification 810, a circuit element model 985 or in any other suitable way. Consequently, the final layout 900 contains optimization based on the knowledge of the selective double patterning technique 809 to optimize a user selected set of product parameters.

The layout thus includes dummy features, for example, that are intentionally added but will be removed at a subsequent step. For example, during physical design 850 or layout generation 900, all or only some dummy features may be added or marked for inclusion in a subsequent step. This information may be transferred to subsequent steps such as automated printing assist feature generation and layout decomposition but also to all the electrical analysis steps such as LVS using different methods in various embodiments. In various embodiments, this may be accomplished by using extra layers (marking layers or design layers or marking edges), rules-based descriptions (for example, measuring dimensions in the layout and/or analyzing the relationship to other existing design levels such as active area or contact levels), or model-based methods (process-based or based on electrical performance that is modeled locally), as well as combinations of all or some of these methods.

This final layout 900 is taped out to manufacturing (chip tapeout 910). The layout 900 is processed to add additional dummy features during mask generation 920. These additional dummy features may be automatically generated (automated dummy gate generation 911) before mask decomposition 912. Such additional dummy features may be in addition to the dummy structures added during the layout design process. Hence, in various embodiments, all or some of the dummy features may be added at this stage. The layout decomposition 912 not only requires information regarding dummy features added to the first mask, but also requires information on their selective removal to appropriately design the second mask (erase or removal mask). Similar to the case of adding information to form the dummy features, information regarding their selective removal is transferred to layout decomposition 912, utilizing various methods, for example, as discussed above (extra layers, rules, models, etc.). The generated mask comprising the first mask and the second mask (erase or removal mask) is used in the manufacturing 930 of the chip.

An embodiment of design methodology using the selective double patterning technique 809 will be described using the flow chart of FIG. 8. This embodiment adds the optimization of process yield to the flow chart described by FIG. 7. The yield extractor 995 reads the layout 900 and extracts a yield based on process models 991 and technology specifications 810. The yield extractor 995 can itself have various levels of sophistication based on need and/or availability of models. For example, the yield extractor 995 may relate local variations in pattern density from the layout 900 and empirically extract a product yield using process models 991. Alternately, the yield extractor 995 may simulate various process steps or combinations of process steps to determine process yield. An objective function that optimizes performance and yield together may be created. Both the yield extractor 995 and the LVS 975 are simultaneously performed to modify the layout 900. On successful optimization, a new layout 900 is generated that meets the specified criteria of co-optimizing process yield and product performance.

An embodiment of design methodology using the selective double patterning technique 809 will be described using the flow chart of FIGS. 9a-9c. The embodiments detail the marking options for implementing the selective double patterning technique. The selective double patterning technique may be introduced in a number of ways. For example, in one embodiment, the dummy features may be drawn. The dummy features may also be marked for removal during subsequent steps. Alternately, in various embodiments, the dummy features may be automatically generated in a separate data preparation step after chip tapeout 910. An embodiment using selective automatic dummy generation 911 is now discussed using FIG. 9a.

The layout after chip tapeout 910 undergoes automatic dummy gate generation 911 (see FIG. 7). This process may comprise the addition of extra layers 1010. Alternately, additional layers may be added during layout design. For example, the layout may comprise design layers 1021 and marking layers 1011. Design layers 1021 include features from the designed layout whereas marking layers 1011 include additional information or data to be used by the dummy feature generation as well as by the mask decomposition processes.

Marking layers 1011 define locations for generation of dummy features as well as locations in which dummy features are not generated. Marking layers 1011 also define the originally drawn or generated dummy features chosen to be removed (or alternately kept) during the second removal process step. As illustrated in FIG. 9a, marking layers 1011 may include means to mark whole shapes or areas by using cover shapes 1013. Similarly, marking layers 1011 may additionally include information for marking the edges of shapes 1014. In each case, the edges or shapes may be marked for either dummy generation or dummy removal. In various embodiments, information from marking layers 1011 regarding dummy generation may be used (for example, during mask decomposition) in forming the first mask whereas information regarding dummy removal may be used in forming the erase mask. Marking layers ion, hence, include information for each shape or edge and define regions in which to generate or to not generate a dummy feature. Similarly, marking layers 1011 also contain shapes or areas, and edges that are marked for dummy removal (and hence also information on dummy features that are not removed).

Design layers 1021 include features from the designed layout and include dummy features such as dummy gates 1022 and functional or active gates 1023. Design layers 1021 may also include additional information regarding these features. In various embodiments, design layers 1021 additionally include information on neighboring features to the active gates 1023, such as neighboring dummy gates 1022. For instance, an active gate 1023 located in the center of a stacked gate structure may not contain information on neighboring dummies, whereas another active gate 1023 on the edge of the stacked gate structure may include information on neighboring dummies. For example, design layers 1021 may include information on neighboring dummy gates 1022 that are removed or kept. Alternately or additionally, design layers 1021 identify dummy gates and their future status (e.g., removed).

Figure 9B:
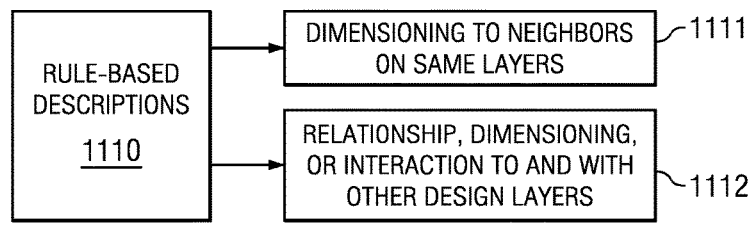
Figure 9C:
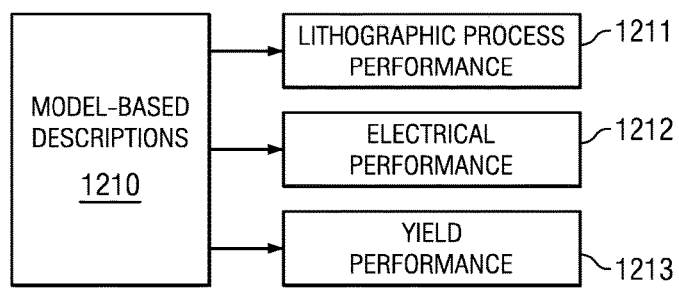

In other embodiments, as illustrated in FIG. 9b, the layout may be marked using a rule based descriptions 1110. For example, as illustrated in box 1112, relationship, dimensioning, or interaction with other design layer or neighboring regions may be used in formulating the rules. As shown in box 1111, in some cases, the rules may be formulated for dimensioning based on neighbors within the same design layers. Similarly, as illustrated in FIG. 9c, model-based descriptions 1210 may be used in some embodiments. For instance, such descriptions may include lithography process based performance 1211, electrical performance 1212 or yield performance 1213, etc. The layout is decomposed using these marking options and information regarding the selective double patterning technique and masks comprising at least a generation mask for creating the dummy features and at least an erase mask for removing the dummy features is generated for manufacturing.

An embodiment of design methodology using the selective double patterning technique 809 will be described using the flow chart of FIG. 10. This embodiment combines many of the interactions of the selective double patterning technique 809 during various stages in the design and manufacturing of an integrated chip.

Figure 10:
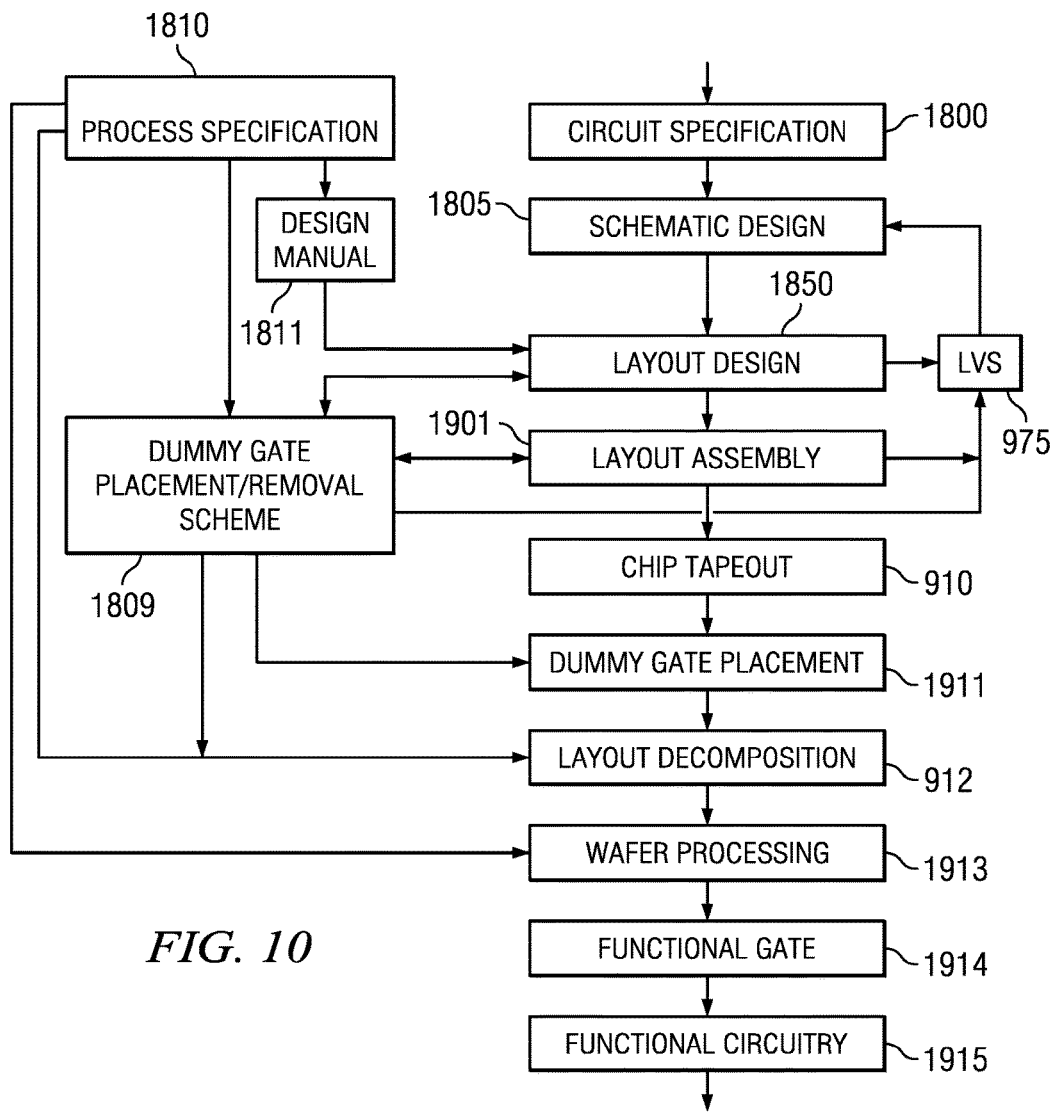
FIG. 10 illustrates a flow chart of an embodiment of the invention in generating a layout.

As illustrated in FIG. 10, the dummy gate placement/removal scheme 1809 may be implemented in various stages either during or after layout design. The dummy gate placement/removal scheme 1809 also includes information from process specification 1810 containing the details of the process. As discussed, the dummy gate placement/removal scheme 1809 is used either before or after chip tapeout 910. Each step may utilize only certain specific aspects of the dummy gate placement/removal scheme 1809. The circuit specification 1800 and schematic design 1805 are first generated. The chip is taped out undergoing several steps including layout design 1850 (which in turn depends on the process specification 1810 through, for example, a design manual 1811), layout assembly 1901 and LVS 975. The dummy features may be added (dummy gate placement 1911) after chip tapeout 910 using, for example, an automated step. Various post processing steps may be performed and the layout is decomposed to form a mask file suitable for mask generation (layout decomposition 912). The mask set comprising a generation mask and an erase mask is generated after layout decomposition 912. The generated masks are used in wafer processing 1913 that eventually forms functional gates 1914 and functional circuitry 1915. In the embodiment described in FIG. 10, the dummy gate placement/removal scheme 1809 may place and remove dummy gates in a number of different ways. For example, in various embodiments, all or some of the dummy gates may be placed during layout design 1850. In some embodiments, all or some of the dummy gates may be placed during dummy gate placement 1911. In various embodiments, the dummy gates may be placed during both layout design 1850 and dummy gate placement 1911. Similarly, the dummy gates may be fully or partially removed during wafer processing 1913, which is defined and coded into the mask layout of the second mask during layout decomposition 912.

The dummy gate placement/removal scheme 1809 may be implemented in various embodiments as a generic description understood by a supporting software framework or data preparation tools. In some embodiments, the dummy gate placement/removal scheme 1809 may comprise a layout design marking layer. In other embodiments, the dummy gate placement/removal scheme 1809 may comprise individual gate layers to distinguish between different types of gates. For example, functional gates may be divided into different layers based on neighboring gates. For instance, gates that are bounded by dummy gate neighbors may be separated into a different layer. Similarly, in some embodiments, the dummy gate placement/removal scheme 1809 may comprise a rule, model, or functionality based description. In some embodiments, the dummy gate placement/removal scheme 1809 may be a suitable combination of any of the above schemes.

Embodiments of a semiconductor device manufactured in accordance with embodiments of the invention will now be described using FIGS. 11-16.

First, an embodiment of the semiconductor device manufactured in accordance with an embodiment of the present invention is described in FIG. 11, and includes FIGS. 11a and 11b, wherein FIG. 11a illustrates a cross sectional view and FIG. 11b illustrates the top view. FIG. 11 illustrates transistor array bow containing minimum pitch transistors 101-105 in transistor region 100 and isolated transistors 201 in transistor region 200, wherein the transistor region 200 contains dummy gate regions 210 and 211, whereas the transistor region 100 does not. The dummy regions 110 and 111 in region 100 (shown by dashed lines) have been selectively removed using the erase mask 509 of FIG. 2b. For example, this may be done to minimize the performance difference between isolated and minimum pitch devices. The isolated transistors in the presence of the dummy gates 20 behave similarly to minimum pitch devices.

An embodiment of the semiconductor device manufactured in accordance with an embodiment of the present invention is described in FIG. 12, which includes FIGS. 12a and 12b, wherein FIG. 12a illustrates the cross sectional view and FIG. 12b illustrates the top view. In FIG. 12, the transistor regions 100 and 200 comprise isolated transistors 101 and 201 of length L and width W. The dummy regions 210 and 211 in transistor region 200 (shown by dashed lines) have been selectively removed using the erase mask 509 of FIG. 2b. However, the dummy regions 110 and 111 are present on transistor region 100. The effective gate pitch of transistor regions 100 is thus reduced resulting in transistors of lower performance locally. For example, such a structure may be needed if transistor region 100 is neighboring a density sensitive region.

Figure 13A:
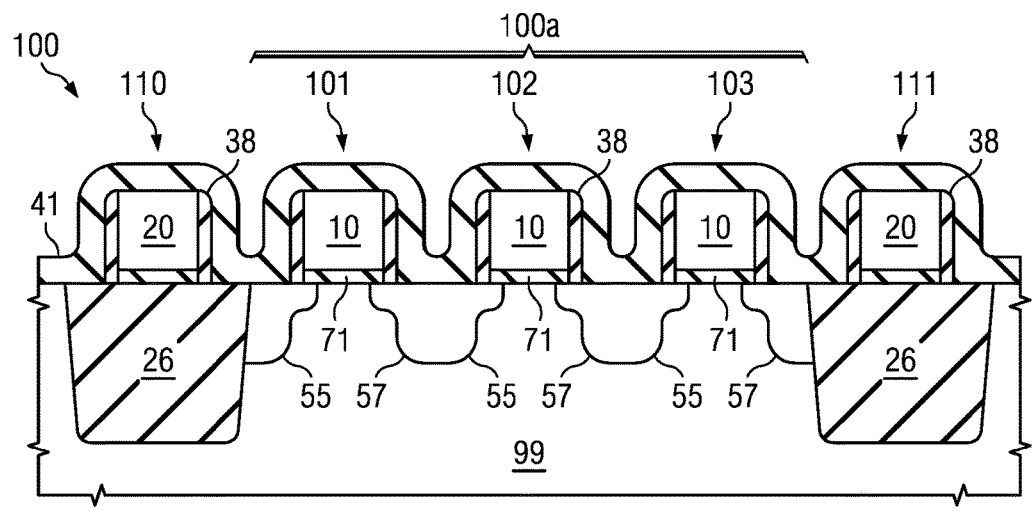
FIGS. 13a and 13b illustrate a cross-sectional view of an embodiment of an integrated circuit manufactured in accordance with embodiments of the invention.
Figure 13B:
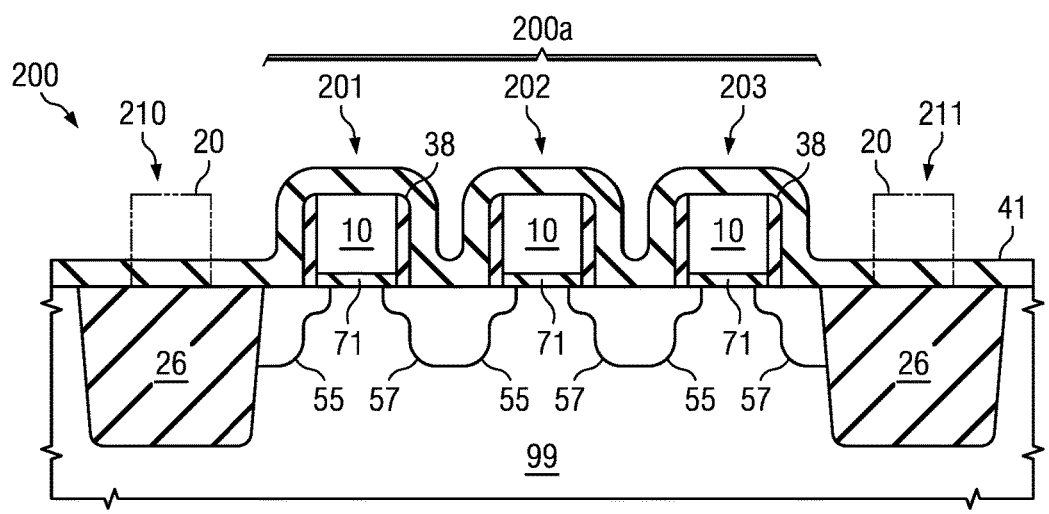

FIG. 13 illustrates a fourth embodiment of the semiconductor device manufactured in accordance with an embodiment of the present invention. In FIG. 13, the transistor regions 100 and 200 comprise transistor arrays 100a and 200a containing minimum pitch transistors 101-103 and 201-203. However, the dummy gates 20 (regions 110 and in) are present only on transistor region 100. The dummy regions 210 and 211 have been removed from transistor region 200 using the second erase mask. Although only three transistor gates are drawn, the transistor arrays 100a and 200a in transistor regions 100 and 200 may comprise any number of transistors.

In embodiments described so far, the location of the erase mask step in the process flow is only of minor importance. For example, in most cases, the dummy regions may be removed either immediately after the first exposure as shown in FIG. 3, or in a subsequent process step after the gate stack formation. In preferred embodiments, the erase mask step immediately follows the first mask step to reduce errors for example from misalignment. However, in some embodiments the exact location of the second mask step can be important. FIG. 14 illustrates such an example in the formation of a transistor with source/drain stressors 43. The source/drain regions could be SiGe layers deposited to compressively strain the silicon channel of p-channel transistors.

The stressors 43 are deposited by etching a region of the silicon substrate 99 after gate stack formation. In the embodiment shown in FIG. 14, the second mask step may be performed after formation of SiGe stressors but before the formation of source/drain implants. The transistor regions 100 and 200 are shown after the completion of the second erase step. Region 100 comprises an isolated transistor 101 and region 200 contain transistor arrays 201-204. However, as shown in FIG. 14, both regions 100 and 200 have similar formation of stressor layers 43. In other words, the relative ratio of stressor layers 43 and substrate 99 is similar. Hence, such an embodiment would generate uniform strain profiles (for example, minimize differences in channel strain between isolated and dense transistor layouts), and would also minimize any negative impact arising from non-uniform formation of source/drain regions.

An embodiment of the semiconductor device manufactured in accordance with an embodiment of the present invention is described in FIG. 15, which includes FIGS. 15a and 15b. In various embodiments described in FIG. 15, the second mask 509 of FIG. 2b, also referred to as an erase or cut mask, selectively removes regions of the dummy lines "locally." For example, to enhance strain, the first dummy line adjacent to a gate line is removed. However, to enable process yields, the dummy lines 20 are retained further into the isolation region 26. FIG. 15a illustrates an example using this approach for an isolated device 201 and FIG. 15b illustrates this approach for a densely packed transistor array.

In FIG. 15a, the active poly line 10 forms transistor 201, whereas the dummy lines 20 form dummy features 210-213. The dummy features 214 and 215 (shown by dashed lines) have been selectively removed to increase the distance $d_1$ between the active poly line 10 or transistor gate 201 and the next dummy feature 211 or 212. However, neighboring dummy features may not be removed, for example, to maintain uniform etching from a subsequent CMP process. For example, the distance $d_2$ between dummy features 212 and 213 and distance $d_3$ between features 210 and 211 may be smaller than distance $d_1$. Thus, this illustrates an embodiment where transistor performance metrics are co-optimized with process margin and yield issues.

In FIG. 15b, the active poly line 10 forms transistors 101-103 separated by the pitch p, whereas the dummy lines 20 form dummy features 210-213. The dummy features 214 and 215 (shown by dashed lines) have been selectively removed to increase the distance $d_1$ between the active poly line 10 or transistor 101 and the next dummy feature 211 or transistor 103 to next dummy feature 212. As in FIG. 13a, the distance $d_2$ between dummy features 212 and 213 and the distance $d_3$ between features 210 and 211 may be smaller than $d_1$.

Although in FIG. 15, only one dummy region per side is removed, in alternate embodiments, more neighboring dummy regions may also be removed. For example, in FIG. 15b, dummy regions 211 and 212 may also be removed in some embodiments.

In various embodiments discussed so far, the use of a selective double patterning technique illustrated creation of symmetric devices. However, as shown in various embodiments in FIG. 16, asymmetric devices may be created using this technique. Asymmetric devices are useful in a number of circuits such as, for example, in analog applications.

Figure 16B:
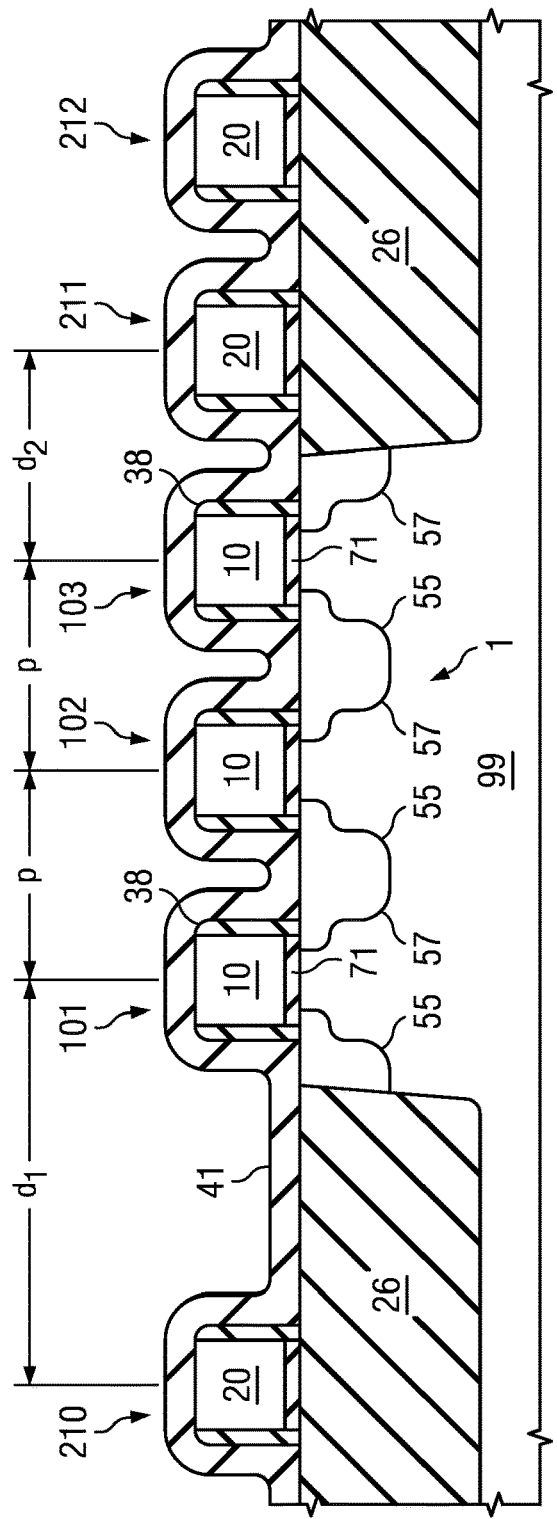

FIG. 16a illustrates the formation of an asymmetric transistor due to selective removal of printing assist patterns from transistor regions. The transistor 201 has a neighboring dummy gate line 20 on one side (the drain 57 side). The dummy gate line 211 on the source 55 side has been removed. Consequently, the strain profile on the source 55 side is different from the strain profile in the drain 57 side of the transistor 201. It is well known that transistor performance especially for scaled devices depends on carrier injection velocity on the source side (location of this region within the channel region 18 is shown by the arrow), which in turn determines the source side mobility or strain in the transistor. Consequently, the illustrated device is asymmetric, i.e., it behaves differently if biased from the drain side versus biased from the source side. Further this asymmetry is present only during the "ON" phase. In other words, threshold of the asymmetric devices are not significantly asymmetric in the two scenarios.

In a different embodiment shown in FIG. 10, the transistors 101-103 are formed with a pitch p (distance between them). The printing assist features are formed irregularly, for example the distance $d_1$ of the transistor 101 to the adjacent dummy feature 210 is different from the distance $d_2$ of the transistor 103 to the adjacent transistor 211. Consequently, this forms an asymmetric stack of transistors.

Although embodiments of the present invention and their advantages have been described in detail, it should be understood that various changes, substitutions and alterations can be made herein without departing from the spirit and scope of the invention as defined by the appended claims. For example, it will be readily understood by those skilled in the art that many of the features, functions, processes, and materials described herein may be varied while remaining within the scope of the present invention. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of making an integrated circuit, the method comprising:
   generating devices with different performance levels, wherein the different performances are obtained by varying number, spacing and width of dummy features;
   designing a circuit comprising the devices with the different performance levels;
   generating a layout of the circuit using a representation of a selective double patterning technique;
   extracting a functionality of the layout;
   comparing the extracted functionality to a predetermined functionality of the designed circuit:
   repeating generating, extracting and comparing until a satisfactory layout is generated;
   fabricating a mask set based upon the satisfactory layout; and
   using the mask set, producing the integrated circuit having the design circuit.

2. The method of claim 1, wherein the representation comprises a generic description, a model, a rule, an electrical behavior and/or a yield behavior.

3. The method of claim 1, wherein the functionality comprises product performance, product area, process yield, or process window.

4. The method of claim 3, wherein the product performance comprises performance, active and standby power, or leakage.

5. The method of claim 3, wherein the process window comprises critical dimension tolerances, across-chip line width variations or across-device line width variations.

6. The method of claim 1, wherein the mask set comprises a generation mask and an erase mask.

7. The method of claim 1, wherein generating the layout comprises:
   generating a first marking layer, the first marking layer comprising marking regions and edges for placement of first dummy features;
   generating a first design layer, the first design layer comprising the first dummy features and active features, wherein the active features additionally contain information on placing neighboring first dummy features;
   generating a second marking layer, the second marking layer comprising marking regions and edges for removal of the first dummy features;
   generating a second design layer, the second design layer comprising the first dummy features and the active features, wherein the active features additionally contain information on removing neighboring first dummy features; and
   placing the first dummy features on the layout for a generation mask of the mask set.

8. The method of claim 7, wherein fabricating the mask set comprises:
   fabricating the generation mask comprising the first dummy features and second dummy features; and
   fabricating an erase mask comprising features for partially or completely removing the first dummy features.

9. The method of claim 8, wherein placing the first dummy features is performed automatically after layout generation.

10. The method of claim 8, wherein the first dummy features are added or removed based on one of information in additional layers in the layout, additional rules, or models.

11. The method of claim 8, further comprising:
placing second dummy features in the generation mask after layout design but before layout decomposition; and
completely removing the second dummy features.

12. The method of claim 11, wherein the second dummy features are added or removed based on one of information in additional layers in the layout, additional rules, or models.

13. The method of claim 11, wherein the erase mask further comprises features for partially or completely removing the second dummy features, wherein features on the erase mask do not remove all of the first and second dummy features.

\* \* \* \* \*